US009588859B2

(12) United States Patent
Wu et al.

(10) Patent No.: US 9,588,859 B2
(45) Date of Patent: Mar. 7, 2017

(54) DETECTING CIRCUIT AND RELATED CIRCUIT DETECTING METHOD

(71) Applicant: MEDIATEK INC., Hsin-Chu (TW)

(72) Inventors: Chien-Hua Wu, Taipei (TW); Kuan-Hua Chao, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 299 days.

(21) Appl. No.: 14/078,548

(22) Filed: Nov. 13, 2013

(65) Prior Publication Data

US 2014/0145708 A1    May 29, 2014

Related U.S. Application Data

(60) Provisional application No. 61/730,513, filed on Nov. 28, 2012.

(51) Int. Cl.
*G01R 19/14* (2006.01)
*G06F 11/22* (2006.01)

(52) U.S. Cl.
CPC ........ *G06F 11/221* (2013.01); *G06F 11/2215* (2013.01); *G06F 11/2247* (2013.01)

(58) Field of Classification Search
CPC . G06F 11/221; G06F 11/2215; G06F 11/2247
USPC ......................................... 370/463; 375/360
See application file for complete search history.

(56) References Cited

U.S. PATENT DOCUMENTS

| 5,148,115 A | * | 9/1992 | Koakutsu | ................ | H03F 1/305 |
| | | | | | 330/2 |
| 5,418,702 A | * | 5/1995 | Marinus | ............ | H02M 3/33569 |
| | | | | | 363/131 |
| 5,991,885 A | * | 11/1999 | Chang | ....................... | G06F 1/26 |
| | | | | | 710/62 |
| 6,497,659 B1 | * | 12/2002 | Rafert | .................... | A61B 5/145 |
| | | | | | 600/322 |

(Continued)

FOREIGN PATENT DOCUMENTS

| CN | 1787505 A | * | 6/2006 |
| CN | 1916879 A | | 2/2007 |

(Continued)

OTHER PUBLICATIONS

STMicroelectronics, USB Charger Detection Interface, Nov. 2008, www.st.com.*

(Continued)

*Primary Examiner* — Jermele M Hollington
*Assistant Examiner* — Sean Curtis
(74) *Attorney, Agent, or Firm* — Winston Hsu; Scott Margo

(57) ABSTRACT

A detecting circuit includes: a testing signal generator, arranged to selectively generate a testing signal having a first signal edge or a second signal edge to a connecting port; and a detector, arranged to detect a first detect signal on the connecting port after the testing signal having the first signal edge is coupled to the connecting port, and to detect a second detect signal on the connecting port after the testing signal having the second signal edge is coupled to the connecting (Continued)

port; wherein the detector is further arranged to determine if an external circuit element is coupled between the connecting port and a reference voltage according to the first detect signal and the second detect signal.

22 Claims, 19 Drawing Sheets

(56) References Cited

U.S. PATENT DOCUMENTS

| | | | | |
|---|---|---|---|---|
| 7,237,719 B2* | 7/2007 | Fruhauf | ............... | G06K 19/077 235/451 |
| 7,414,606 B1* | 8/2008 | Wong | ............... | G09G 3/2096 345/1.1 |
| 7,565,561 B2* | 7/2009 | Yanagawa | ......... | G03G 15/5004 713/310 |
| 7,635,280 B1* | 12/2009 | Crumlin | ............ | H01R 13/7039 439/489 |
| 7,644,217 B2* | 1/2010 | Butler | ............... | G06F 1/3203 326/30 |
| 7,694,062 B1* | 4/2010 | Tsu | .................... | G06F 13/4072 710/316 |
| 7,880,475 B2* | 2/2011 | Crumlin | ............ | H01R 13/7039 324/539 |
| 7,987,298 B2* | 7/2011 | Chang | ............... | H04M 1/72527 324/76.11 |
| 8,013,616 B2* | 9/2011 | Crumlin | ............ | H01R 13/7039 324/539 |
| 8,107,009 B2* | 1/2012 | Takita | ............... | H04N 1/00291 348/552 |
| 8,183,886 B2* | 5/2012 | Payrat | ............... | G06F 13/385 326/21 |
| 8,219,729 B1* | 7/2012 | Wright | ............... | G06F 13/4022 710/104 |
| 8,497,696 B2* | 7/2013 | Reichel | ............ | G01R 1/06788 324/121 R |
| 8,791,691 B2* | 7/2014 | Cheng | ............... | H04L 25/0298 324/140 R |
| 8,799,527 B2* | 8/2014 | Mullins | .............. | H04M 1/0274 710/16 |
| 8,896,289 B2* | 11/2014 | Chen | ..................... | G01R 17/10 324/101 |
| 9,170,973 B2* | 10/2015 | Sasaki | ............... | G06F 13/4072 |
| 2007/0274111 A1* | 11/2007 | Adragna | ............... | H02M 3/28 363/74 |
| 2008/0215765 A1* | 9/2008 | Butler | .................. | G06F 1/3203 710/15 |
| 2009/0189572 A1* | 7/2009 | Kamatani | ............ | H01M 10/44 320/163 |
| 2012/0119791 A1* | 5/2012 | Hsiao | .................... | G01D 21/00 327/100 |
| 2013/0006536 A1* | 1/2013 | Kraft | ................. | A61B 5/14532 702/19 |
| 2013/0307525 A1* | 11/2013 | Chen | .................... | G01R 17/10 324/101 |
| 2014/0035747 A1* | 2/2014 | Ewen, III | .......... | G08B 13/1418 340/568.2 |
| 2014/0075069 A1* | 3/2014 | Mullins | .............. | H04M 1/0274 710/106 |
| 2015/0137789 A1* | 5/2015 | Furtner | ................. | G05F 5/00 323/318 |

FOREIGN PATENT DOCUMENTS

| | | |
|---|---|---|
| CN | 101639818 A | 2/2010 |
| CN | 102750252 A | 10/2012 |
| JP | 2000230960 A | 8/2000 |

OTHER PUBLICATIONS

Texas Instruments, bq24392 Dual SPST USB 2.0 High Speed Switch with USB Battery Charging Specifcation, Jun. 2012-Revised Jan. 2015, www.ti.com.*

* cited by examiner

DETECTING CIRCUIT AND RELATED CIRCUIT DETECTING METHOD

CROSS REFERENCE TO RELATED APPLICATIONS

This application claims the benefit of U.S. Provisional Application No. 61/730,513, which was filed on Nov. 11, 2012 and is included herein by reference.

BACKGROUND

The present invention relates to a detecting circuit and a circuit detecting method, and more particularly to a detecting circuit for detecting a connecting condition of an external terminal circuit, and a method thereof.

Universal Serial Bus (USB) is a standard interface for connecting peripheral devices to a host computer. For USB 3.0, the USB 3.0 receivers terminate the transmission line by placing a small resistor to ground. Transmitters will check for this termination resistor on the receiver as a way for detecting the presence of a USB 3.0 receiver. In some cases, however, receivers may terminate the transmission line by placing the small resistor to the supply voltage rather than ground when coupling the receivers to the transmitters. When this happens, the transmitter may fail to detect the presence of the small resistor. Therefore, there is a need to improve the conventional methods for different situations in order to precisely detect the presence of the termination that is not conformed to USB 3.0 standard and make the transmitter compatible with different receiver specifications.

SUMMARY

One objective of the present embodiment is to provide a detecting circuit for detecting a connecting condition of an external terminal circuit, and a method thereof.

According to a first embodiment of the present invention, a detecting circuit is provided. The detecting circuit comprises a testing signal generator and a detector. The testing signal generator is arranged to selectively generate a testing signal having a first signal edge or a second signal edge to a connecting port. The detector is arranged to detect a first detect signal on the connecting port after the testing signal having the first signal edge is coupled to the connecting port, and to detect a second detect signal on the connecting port after the testing signal having the second signal edge is coupled to the connecting port; wherein the detector is further arranged to determine if an external circuit element is coupled between the connecting port and a reference voltage according to the first detect signal and the second detect signal.

According to a second embodiment of the present invention, a detecting circuit is provided. The detecting circuit comprises a testing signal generator and a detector. The testing signal generator is arranged to generate a first testing signal having a first signal edge and a second testing signal having a second signal edge, and to couple the first testing signal and the second testing signal to a first connecting port and a second connecting port respectively. The detector is arranged to detect a first detect signal on the first connecting port after the first testing signal is coupled to the first connecting port, and to detect a second detect signal on the second connecting port after the second testing signal is coupled to the second connecting port; wherein the detector is further arranged to determine if a first external circuit element is coupled between the first connecting port and a reference voltage and if a second external circuit element is coupled between the second connecting port and the reference voltage according to the first detect signal and the second detect signal.

According to a third embodiment of the present invention, a circuit detecting method is provided. The circuit detecting method comprises: selectively generating a testing signal having a first signal edge or a second signal edge; coupling the testing signal to a connecting port; detecting a first detect signal on the connecting port after the testing signal having the first signal edge is coupled to the connecting port; detecting a second detect signal on the connecting port after the testing signal having the second signal edge is coupled to the connecting port; and determining if an external circuit element is coupled between the connecting port and a reference voltage according to the first detect signal and the second detect signal.

According to a fourth embodiment of the present invention, a circuit detecting method is provided. The circuit detecting method comprises: generating a first testing signal having a first signal edge and a second testing signal having a second signal edge; coupling the first testing signal and the second testing signal to a first connecting port and a second connecting port respectively; detecting a first detect signal on the first connecting port after the first testing signal is coupled to the first connecting port; detecting a second detect signal on the second connecting port after the second testing signal is coupled to the connecting port; and determining if a first external circuit element is coupled between the first connecting port and a reference voltage and if a second external circuit element is coupled between the second connecting port and the reference voltage according to the first detect signal and the second detect signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
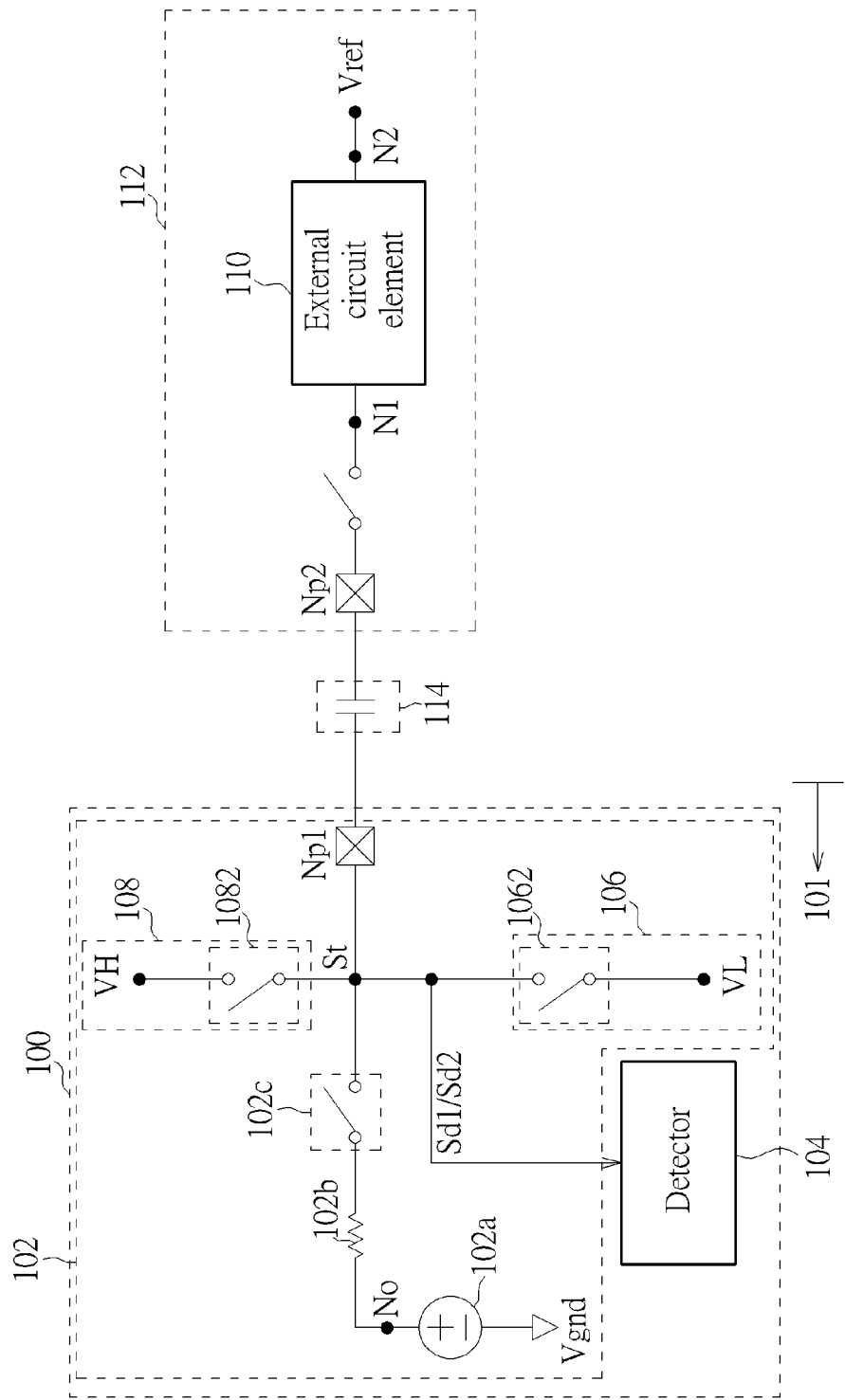
FIG. 1 is a diagram illustrating a detecting circuit according to a first exemplary embodiment of the present invention.

Please refer to FIG. 1, which is a diagram illustrating a detecting circuit 100 according to an exemplary embodiment of the present invention. The detecting circuit 100 is used to detect the remote connection of AC coupled application. More specifically, in the field of AC coupled application, the detecting circuit 100 is capable of determining if a terminal circuit (e.g. an external resistor) is terminated to a reference voltage Vref, wherein the reference voltage Vref may be a ground voltage Vgnd, a supply voltage Vdd, or a common mode voltage Vcm.

In the following description, the detecting circuit 100 is installed in a USB (Universal Serial Bus) transmitter 101 (e.g. the USB 3.0 transmitter), and the detecting circuit 100 can be used to detect the presence of a USB receiver 112 (e.g. the USB 3.0 receiver). This is not a limitation of the present invention, however. The detecting circuit 100 may be used in any other kinds of data transmitting interfaces, for example, PCIE interface and other AC coupled interfaces. The detecting circuit 100 comprises a testing signal generator 102 and a detector 104. The testing signal generator 102 is arranged to selectively generate a testing signal St having a first signal edge or a second signal edge to a connecting port Np1 of the USB transmitter 101. The detector 104 is arranged to detect a first detect signal Sd1 on the connecting port Np1 at a first predetermined moment to after the testing signal St having the first signal edge is coupled to the connecting port Np1, and to detect a second detect signal Sd2 on the connecting port Np1 at a second predetermined moment tb after the testing signal St having the second signal edge is coupled to the connecting port Np1. The detector 104 is then arranged to determine the connecting condition of an external circuit element (i.e. the above mentioned terminal circuit), which is also shown and labeled as 110 in FIG. 1 for the purposes of clarity, according to the first detect signal Sd1 and the second detect signal Sd2. More specifically, the detector 104 is arranged to determine if the external circuit element is coupled between the connecting port Np1 and the reference voltage Vref according to the first detect signal Sd1 and the second detect signal Sd2.

It should be noted that the external circuit element 110 may be a resistor installed in the USB receiver 112. When the USB receiver 112 is plugged in the USB transmitter 101, a first terminal N1 of the resistor (i.e. 110) may be coupled to the connecting port Np1 via an AC coupler (i.e. the capacitor 114 as shown in FIG. 1), and the other terminal N2 of the resistor may be coupled to the reference voltage Vref, which may be the ground voltage Vgnd or the supply voltage Vdd. When the USB receiver 112 is plugged in the USB transmitter 101, the USB transmitter 101 should determine the connecting condition of the external circuit element 110 (for example, open or connected to the reference voltage Vref) in the USB receiver 112. In FIG. 1, there might be a switch between the second terminal N2 and the reference voltage Vref.

It also should be noted that the capacitor 114 may be a part of the detecting circuit 100 or a part of the USB receiver 112. For brevity, the capacitor 114 is coupled between the connecting port Np1 of the detecting circuit 100 and the connecting port Np2 of the USB receiver 112 as shown in FIG. 1.

In this exemplary embodiment, the testing signal generator 102 comprises a waveform generator 102a, an output resistor 102b, a switch 102c, a first level setting circuit 106, and a second level setting circuit 108. The waveform generator 102a may be a voltage source, and is arranged to generate a predetermined voltage level V1. The output resistor 102b has a first terminal coupled to the waveform generator 102a for receiving the predetermined signal level V1, and a second terminal coupled to the switch 102c. The switch 102c is arranged for selectively coupling the second terminal of the output resistor 102b to the connecting port Np1 in order to conduct the predetermined signal level V1 to the connecting port Np1.

In addition, the first level setting circuit 106 is coupled to the connecting port Np1 for selectively setting a signal level on the connecting port Np1 into a first signal level. The second level setting circuit 108 is coupled to the connecting port Np1 for selectively setting the signal level on the connecting port Np1 into a second signal level. The first signal level is different from the second signal level. In this exemplary embodiment, the first signal level is a low voltage level VL and the second signal level is a high voltage level VH. The low voltage level VL may be the ground voltage Vgnd, and the high voltage level VH may be the supply voltage Vdd. According to the exemplary embodiment, after the first level setting circuit 106 sets the first signal level VL on the connecting port Np1, the switch 102c is arranged to couple the predetermined signal level V1 to the connecting port Np1, thereby producing the testing signal St having the first signal edge (e.g. a rising edge) on the connecting port Np1. On the other hand, after the second level setting circuit 108 sets the second signal level on the connecting port Np1, the switch 102c is arranged to couple the predetermined signal level V1 to the connecting port Np1, thereby producing the testing signal St having the second signal edge (e.g. a falling edge) on the connecting port Np1.

It should be noted that, in this exemplary embodiment, the rising edge is defined as a voltage waveform transforming towards a higher voltage level from the low voltage level VL. The falling edge is a voltage waveform transforming towards a lower voltage level from the high voltage level VH. Moreover, the rising edge can be any voltage-level difference varied from a lower voltage level into a higher voltage level, and the falling edge can be any voltage-level difference varied from a higher voltage level into a lower voltage level. In other words, the predetermined signal level V1 is between the high voltage level VH and the low voltage level VL. Moreover, for brevity, the first signal edge is the rising edge, and the second signal edge is the falling edge in the following description for this exemplary embodiment.

According to this exemplary embodiment, the present detecting circuit 100 is first arranged to output the testing signal St having the first signal edge to the connecting port Np1, then output the testing signal St having the second signal edge to the connecting port Np1, and then determine the connecting condition of the external circuit element 110 (for example, connect to or disconnect from the reference voltage Vref, where the reference voltage Vref might be the supply voltage Vdd or the ground voltage Vgnd) according to both the detecting results. By using two kinds of signal edges in detection, no matter what kind of termination being used in the receiver 112, i.e., no matter the termination of the receiver is connected to/disconnected from the supply voltage Vdd or the ground voltage Vgnd, the present USB transmitter 101 is capable of precisely determining the kind of terminal of the receiver 112. Accordingly, the present USB transmitter 101 is more adaptive for various kinds of receiver. To more clearly illustrate the features of the present invention, the following paragraphs are divided into four parts. The first part I mainly focus on the embodiments where the termination of the receiver 112 is disconnected from the supply voltage Vdd, the second part II mainly focus on the embodiments where the termination of the receiver 112 is disconnected from the ground voltage Vgnd, the third part III mainly focus on the embodiments where the termination of the receiver 112 is connected to the supply voltage Vdd or the ground voltage Vgnd, and the four part IV recites the other embodiments of the present invention.

Part I

Figure 2:
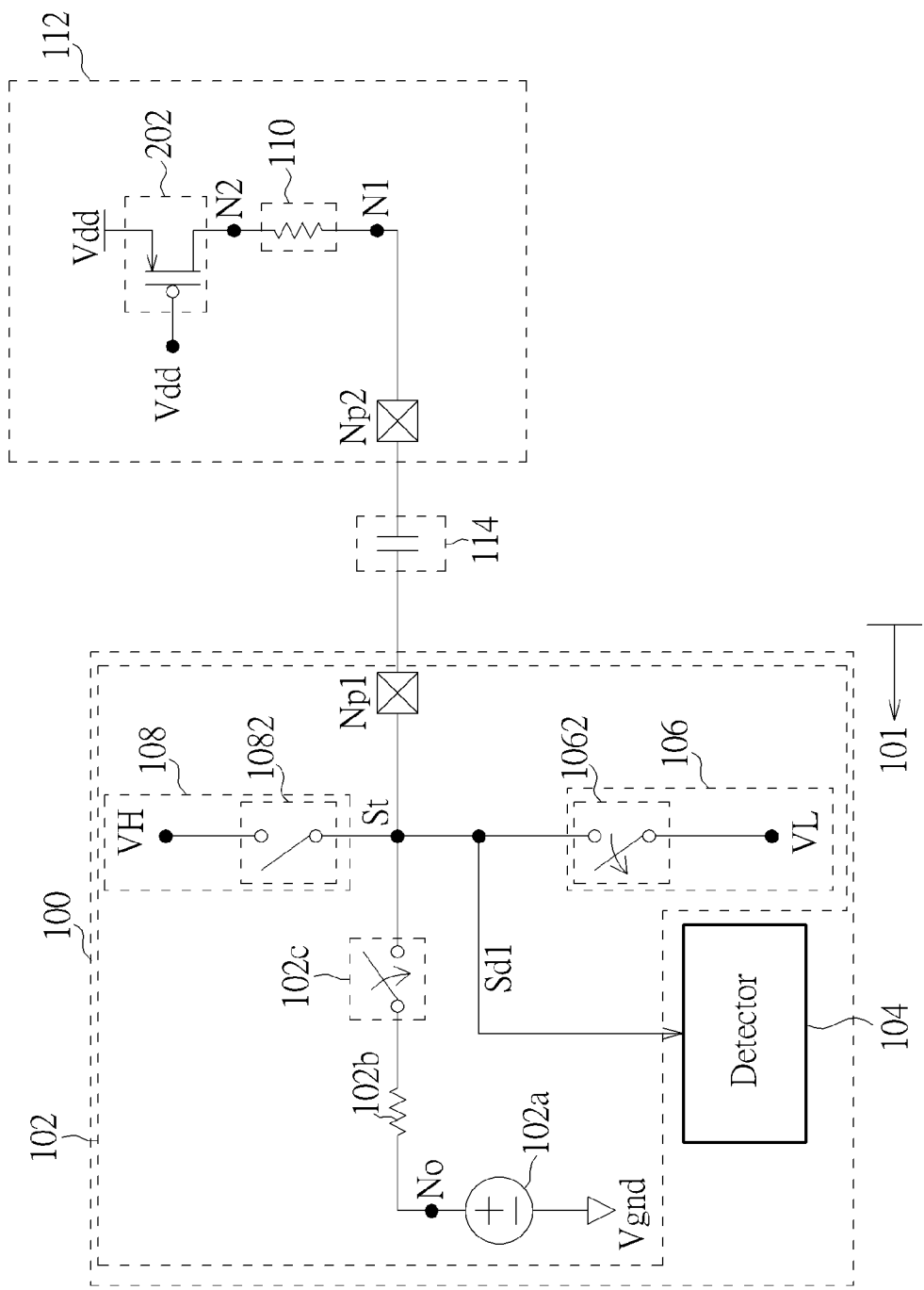
FIG. 2 is a diagram illustrating a situation of when a USB receiver is coupled to a USB transmitter and a terminal of an external circuit element is disconnected from a supply voltage via a PMOS transistor according to an embodiment of the present invention.

When the Termination of the Receiver 112 is Disconnected from the Supply Voltage Vdd Please refer to FIG. 2, which is a diagram illustrating the situation of when the USB receiver 112 is coupled to the USB transmitter 101 and the terminal N2 of the termination (e.g. the external circuit element 110) is disconnected from the supply voltage Vdd via a PMOS transistor 202 according to an embodiment of the present invention. It should be noted that the external circuit element 110 is a resistor, and the first terminal N1 of the external circuit element 110 is coupled to the connecting port Np2, and the other terminal N2 of the external circuit element 110 is coupled to a drain of the PMOS transistor 202. A source of the PMOS transistor 202 is coupled to the supply voltage Vdd, and a gate of the PMOS transistor 202 is also coupled to the supply voltage Vdd. Therefore, the PMOS transistor 202 is turned off. It should be noted that the USB transmitter 101 does not acknowledge the external circuit element 110 is disconnected from the supply voltage Vdd by the PMOS transistor 202 at this point. More specifically, the USB transmitter 101 does not acknowledge the external circuit element 110 is disconnected between the connecting port Np2 and the supply voltage Vdd at this point.

Figure 3:
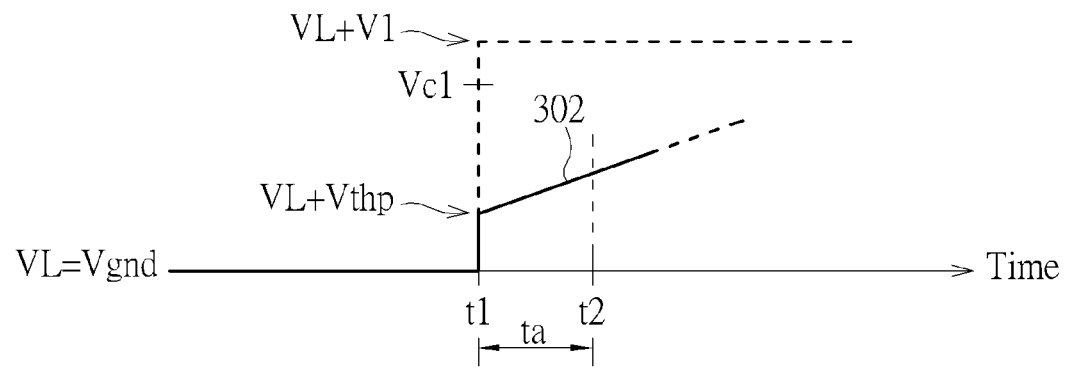
FIG. 3 is a timing diagram illustrating a voltage variation on a connecting port according to a first embodiment of the present invention.

A switch 1062 of the first level setting circuit 106 is first arranged to couple the first signal level VL to the connecting port Np1 to discharge the voltage level on the connecting port Np1 into the first signal level VL (e.g. the ground voltage Vgnd) before the time t1 as shown in FIG. 3. FIG. 3 is a timing diagram illustrating the voltage variation 302 on the connecting port Np1 according to an embodiment of the present invention. Then, at time t1, the switch 1062 is turned off and the switch 102c is arranged to couple the predetermined signal level V1, which is higher than the first signal level VL, to the connecting port Np1. Then, the testing signal St having the first signal edge is coupled to the connecting port Np1 (as the dotted line shown in FIG. 3). However, the voltage on the connecting port Np1 is not changed into the voltage VL+V1 at time t1. Instead, the voltage on the connecting port Np1 is first changed into the voltage VL+Vthp at time t1, and then slowly ramp-up towards the voltage VL+V1 as shown in FIG. 3, wherein the voltage Vthp is substantially equal to the threshold voltage-drop to turn on the PMOS transistor 202. Moreover, the voltage on the connecting port Np2 is not changed into the voltage Vdd+V1 at time t1. Instead, the voltage on the connecting port Np2 is first changed into the voltage Vdd+

Figure 4:
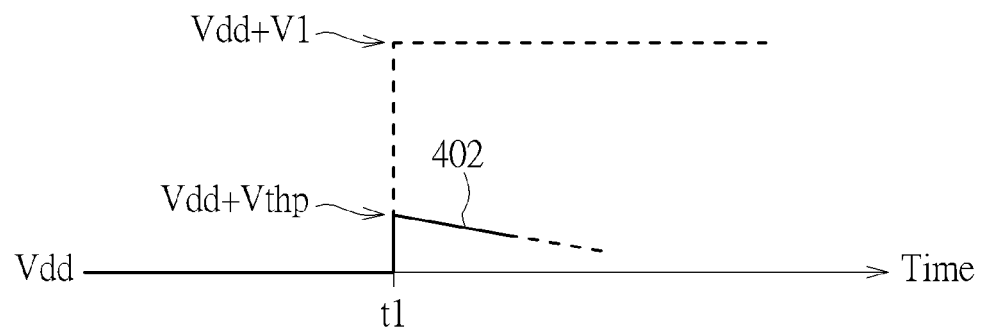
FIG. 4 is a timing diagram illustrating a voltage variation on a connecting port of a USB receiver according to a first embodiment of the present invention.

Vthp at time t1, and then slowly decreases towards the voltage Vdd as shown in FIG. 4. FIG. 4 is a timing diagram illustrating the voltage variation 402 on the connecting port Np2 according to an embodiment of the present invention. It should be noted that the voltage on the connecting port Np2 before the time t1 is charged to the supply voltage Vdd via the PMOS transistor 202.

According to FIGS. 3-4, it can be seen that the voltage on the connecting port Np1 and the connecting port Np2 at the time t1 does not jump by the voltage difference produced by the testing signal generator 102, e.g. the voltage V1. This is because the PMOS transistor 202 is turned on whenever the voltage on the connecting port Np2 reaches the voltage Vdd+Vthp. When the PMOS transistor 202 is turned on, a current will be induced to flow through the PMOS transistor 202 and the external circuit element 110. Accordingly, the voltage on the connecting port Np1 is hindered from rising to the voltage VL+V1 at time t1.

In addition, to determine the connecting condition of the external circuit element 110, the detector 104 is first arranged to detect the voltage (i.e. the first detect signal Sd1) on the connecting port Np1 at the first predetermined moment to (i.e. at time t2) after the testing signal St having the first signal edge is coupled to the connecting port Np1 for determining if the rising edge occurs on the connecting port Np1. According to FIG. 3, it can be seen that the voltage on the connecting port Np1 at time t2 is smaller than the compare voltage Vc1, which means that the connecting port Np1 is still on charging at the time t2. Therefore, the detector 104 determines there is no rising edge occurs on the connecting port Np1 when the testing signal St having the rising edge is coupled to the connecting port Np1 via the output resistor 102b.

Afterwards, the present detecting circuit 100 is arranged to output the testing signal St having the second signal edge (i.e. the falling edge) to the connecting port Np1, and then detect the voltage on the connecting port Np1 to determine if the falling edge occurs on the connecting port Np1. Please refer to FIG. 5, which is a diagram illustrating the situation where the testing signal St having the falling edge is coupled to the connecting port Np1 of the USB transmitter 101 according to an embodiment of the present invention, in which the terminal N2 of the external circuit element 110 is disconnected from the supply voltage Vdd via the PMOS transistor 202.

Figure 6:
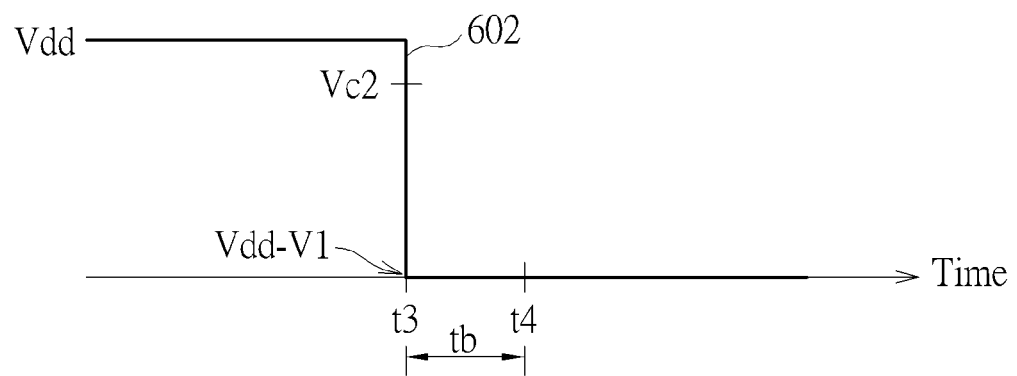
FIG. 6 is a timing diagram illustrating a voltage variation on a connecting port according to a second embodiment of the present invention.
Figure 7:
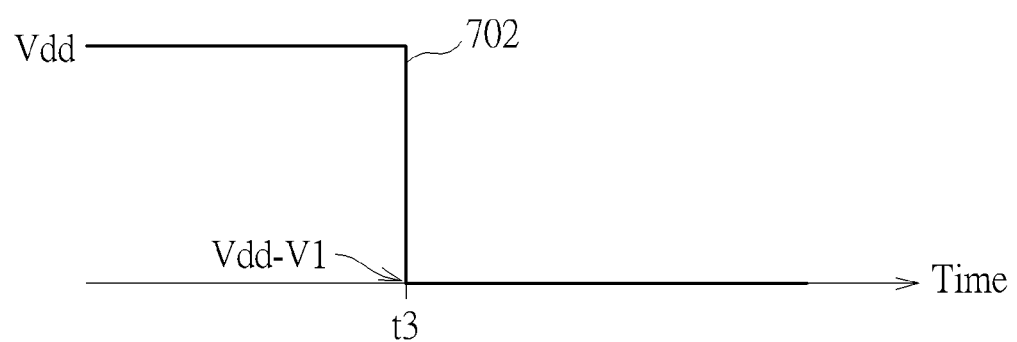
FIG. 7 is a timing diagram illustrating a voltage variation on a connecting port of a USB receiver according to a second embodiment of the present invention.

A switch 1082 of the second level setting circuit 108 is first arranged to couple the second signal level VH to the connecting port Np1 to charge to the voltage level on the connecting port Np1 into the second signal level VH (e.g. the supply voltage Vdd) before the time t3 as shown in FIG. 6. FIG. 6 is a timing diagram illustrating the voltage variation 602 on the connecting port Np1 according to an embodiment of the present invention. Then, at time t3, the switch 1082 is turned off and the switch 102c is arranged to couple the predetermined signal level V1, which is lower than the second signal level VH, to the connecting port Np1. Then, the testing signal St having the second signal edge is coupled to the connecting port Np1. Meanwhile, the voltage on the connecting port Np1 is also changed into the voltage Vdd–V1 at time t3. Moreover, the voltage on the connecting port Np2 is also changed into the voltage Vdd–V1 at time t3 as shown in FIG. 7. FIG. 7 is a timing diagram illustrating the voltage variation 702 on the connecting port Np2 according to an embodiment of the present invention. It should be noted that the voltage on the connecting port Np2 before the time t3 is charged to the supply voltage Vdd via the PMOS transistor 202.

According to FIGS. 6-7, it can be seen that both the voltages on the connecting port Np1 and the connecting port Np2 at the time t3 jump by the voltage difference produced by the testing signal generator 102, i.e. the voltage V1. This is because the PMOS transistor 202 is not turned on by the voltage on the connecting port Np2 at time t3. Accordingly, the voltage on the connecting port Np1 produces a falling edge at time t3.

Again, to determine the connecting condition of the external circuit element 110, the detector 104 is arranged to detect the voltage (i.e. the second detect signal Sd2) on the connecting port Np1 at the second predetermined moment tb (i.e. at time t4) after the testing signal St having the second signal edge is coupled to the connecting port Np1 for determining if the falling edge occurs on the connecting port Np1. According to FIG. 6, it can be seen that the voltage on the connecting port Np1 at time t4 is smaller than a comparison voltage Vc2, which means that the connecting port Np1 stops discharging at the time t4. Therefore, the detector 104 compares the voltage on the connecting port Np1 at time t4 with the comparison voltage Vc2, thus determines there is a falling edge on the connecting port Np1 when the testing signal St having the falling edge is coupled to the connecting port Np1 via the output resistor 102b.

According to the above detecting mechanism, a rising edge does not occur on the connecting port Np1 when the testing signal St having the rising edge is coupled to the connecting port Np1. However, a falling edge occurs on the connecting port Np1 when the testing signal St having the falling edge is coupled to the connecting port Np1. Therefore, the detector 104 determines that the terminal N2 of the external circuit element 110 is not coupled to either the ground voltage Vgnd or the supply voltage Vdd because at least one signal edge occurs on the connecting port Np1. Moreover, as the falling edge occurs on the connecting port Np1 and the rising edge does not occur on the connecting port Np1, the detector 104 can also identify the terminal N2 of the external circuit element 110 is disconnected from the supply voltage Vdd by the turn-off PMOS transistor 202. Therefore, by detecting the connecting port Np1 twice, the connecting condition of the external circuit element 110 can be determined.

It should be noted that the first predetermined moment to and the second predetermined moment tb can be respectively well-defined according to the time constant constituted by the output resistor 102b, the capacitor 114, and the external circuit element 110. The first predetermined moment to may equal or not equal the second predetermined moment tb.

Part II

Figure 8:
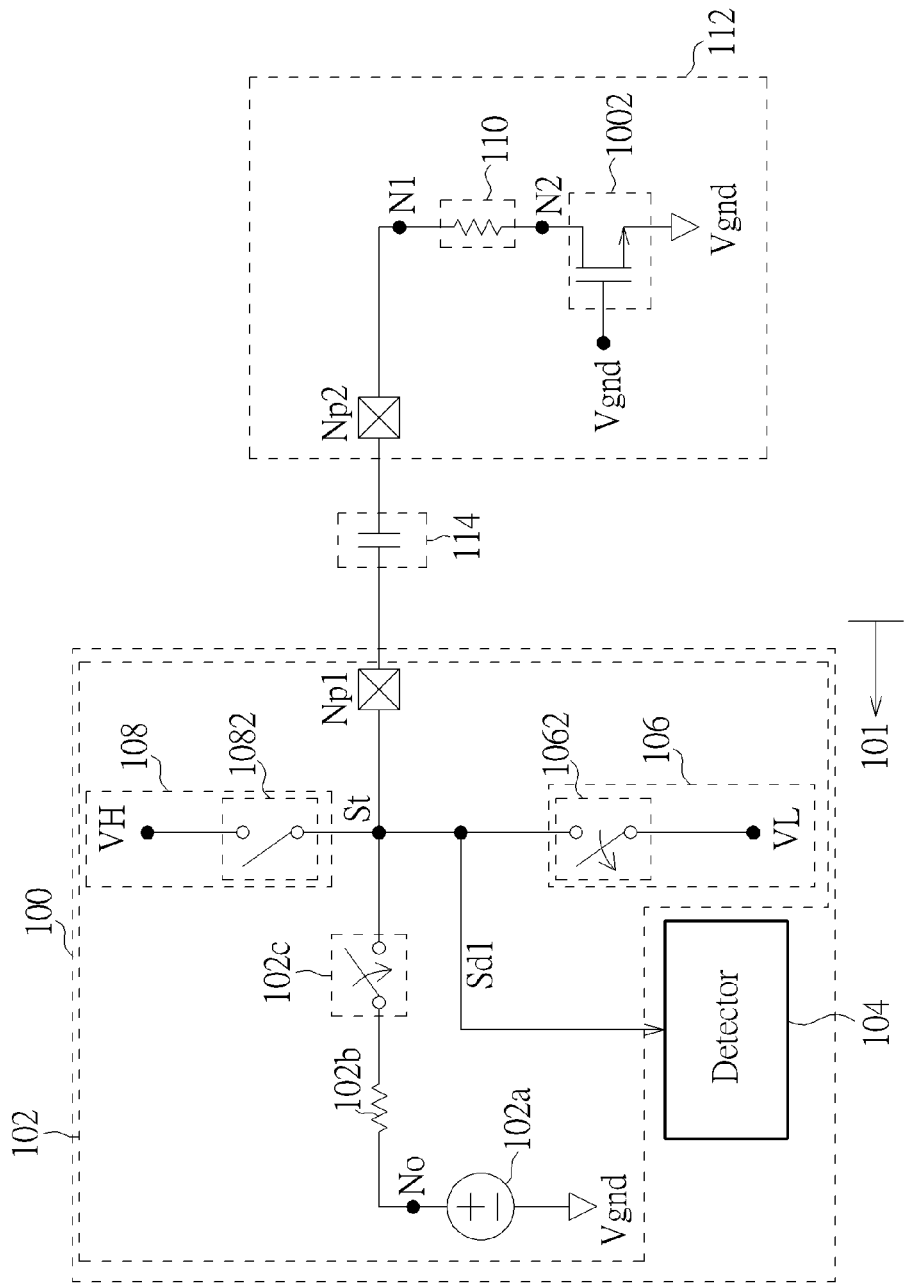
FIG. 8 is a diagram illustrating a situation of when a USB receiver is coupled to a USB transmitter and a terminal of an external circuit element is disconnected from a ground voltage via an NMOS transistor according to an embodiment of the present invention.

When the Termination of the Receiver 112 is Disconnected from the Ground Voltage Vgnd Please refer to FIG. 8, which is a diagram illustrating the situation where the USB receiver 112 is coupled to the USB transmitter 101 and the terminal N2 of the external circuit element 110 is disconnected from the ground voltage Vgnd via an NMOS transistor 1002 according to an embodiment of the present invention. The first terminal N1 of the external circuit element 110 is coupled to the connecting port Np2, and the other terminal N2 of the external circuit element 110 is coupled to a drain of the NMOS transistor 1002. A source of the NMOS transistor 1002 is coupled to the ground voltage Vgnd, and a gate of the NMOS transistor 1002 is also coupled to the ground voltage Vgnd. Therefore, the NMOS transistor 1002 is turned off. It should be noted that the USB transmitter 101 does not acknowledge the external circuit element 110 is disconnected from the ground voltage Vgnd by the NMOS transistor 1002 at this point. More specifically, the USB transmitter 101 does not acknowledge the external circuit element 110 is disconnected between the connecting port Np2 and the ground voltage Vgnd at this point.

Figure 5:
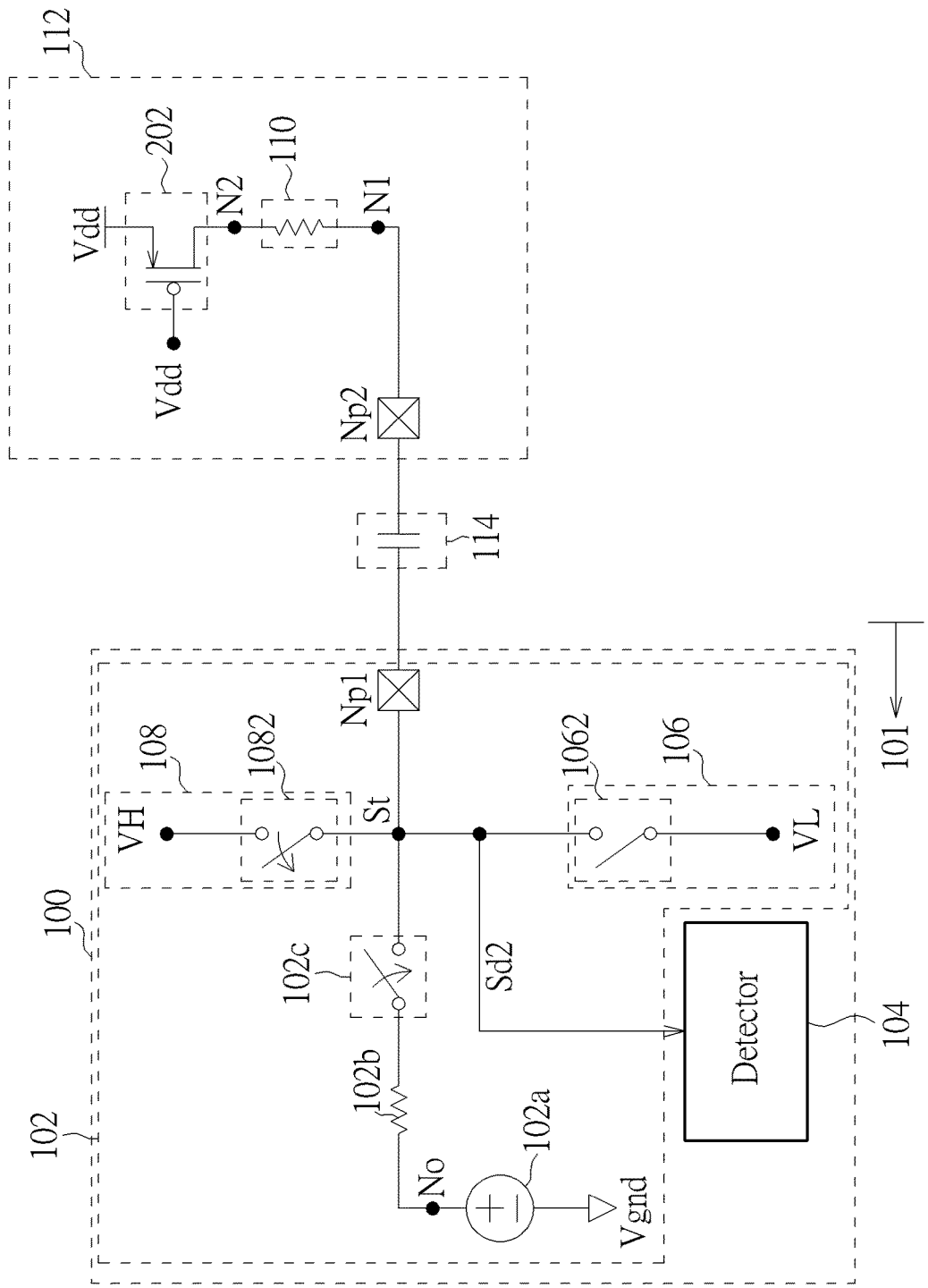
FIG. 5 is a diagram illustrating a situation where a testing signal having a falling edge is coupled to a connecting port of a USB transmitter according to an embodiment of the present invention.
Figure 9:
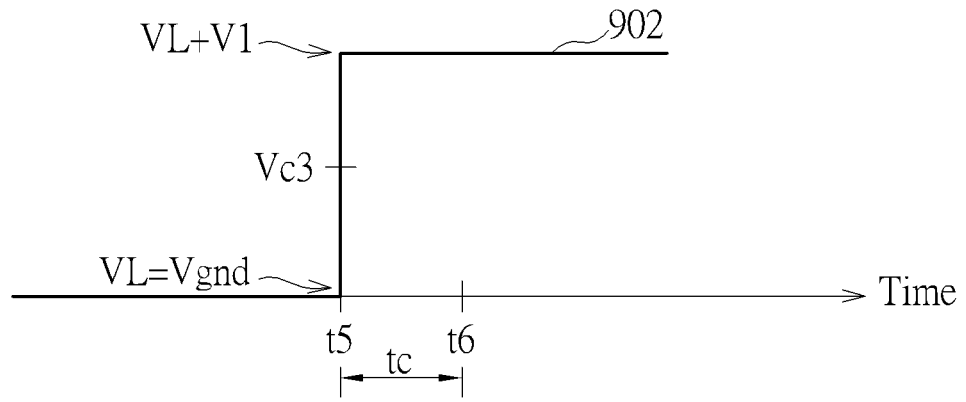
FIG. 9 is a timing diagram illustrating a voltage variation on a connecting port according to a third embodiment of the present invention.
Figure 10:
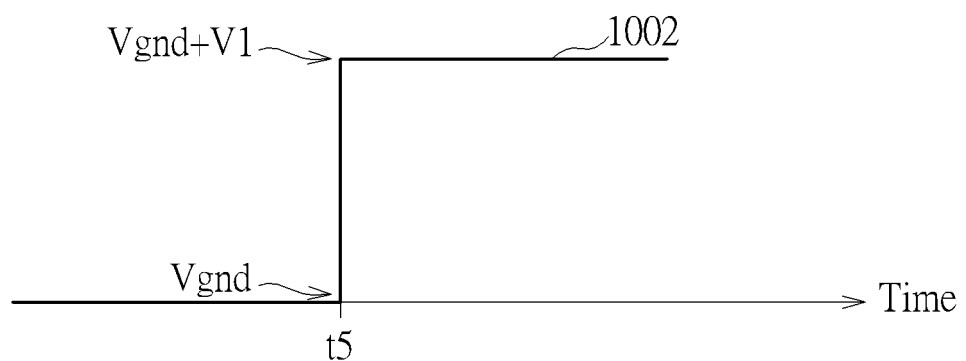
FIG. 10 is a timing diagram illustrating a voltage variation on a connecting port of a USB receiver according to a third embodiment of the present invention.

Similar to FIG. 2 and FIG. 5, the switch 1062 of the first level setting circuit 106 is first arranged to couple the first signal level VL to the connecting port Np1 to discharge to the voltage level on the connecting port Np1 into the first signal level VL (e.g. the ground voltage Vgnd) before the time t5 as shown in FIG. 9. FIG. 9 is a timing diagram illustrating the voltage variation 902 on the connecting port Np1 according to an embodiment of the present invention. Then, at time t5, the switch 1062 is turned off and the switch 102c is arranged to couple the predetermined signal level V1, which is higher than the first signal level VL, to the connecting port Np1. Then, the testing signal St having the first signal edge is coupled to the connecting port Np1. Meanwhile, the voltage on the connecting port Np1 is also changed into the voltage VL+V1 at time t5. The voltage on the connecting port Np2 is also changed into the voltage Vgnd+V1 at time t5 as shown in FIG. 10. FIG. 10 is a timing diagram illustrating the voltage variation 1002 on the connecting port Np2 according to an embodiment of the present invention. It should be noted that the voltage on the connecting port Np2 before the time t5 is discharged to the ground voltage Vgnd via the NMOS transistor 1002.

According to FIGS. 9-10, it can be seen that both the voltages on the connecting port Np1 and the connecting port Np2 at the time t5 jump by the voltage difference produced by the testing signal generator 102, i.e. the voltage V1. This is because the NMOS transistor 1002 is not turned on by the voltage on the connecting port Np2 at time t5. Accordingly, the voltage on the connecting port Np1 produces a rising edge at time t5.

Again, to determine the connecting condition of the external circuit element 110, the detector 104 is arranged to detect the voltage (i.e. the first detect signal Sd1) on the connecting port Np1 at the first predetermined moment tc (i.e. at time t6) after the testing signal St having the first signal edge is coupled to the connecting port Np1 for determining if the rising edge occurs on the connecting port Np1. According to FIG. 9, it can be seen that the voltage on the connecting port Np1 at time t6 is higher than a comparison voltage Vc3, which means that the connecting port Np1 stops charging at the time t6. Therefore, the detector 104 compares the voltage on the connecting port Np1 at time t6 with the compare voltage Vc3 to determine if the rising edge occurs on the connecting port Np1. In FIG. 9, the voltage on the connecting port Np1 at time t6 is higher than the comparison voltage Vc3, thus the detector 104 determines there is a rising edge on the connecting port Np1 when the testing signal St having the rising edge is coupled to the connecting port Np1 via the output resistor 102b.

Figure 11:
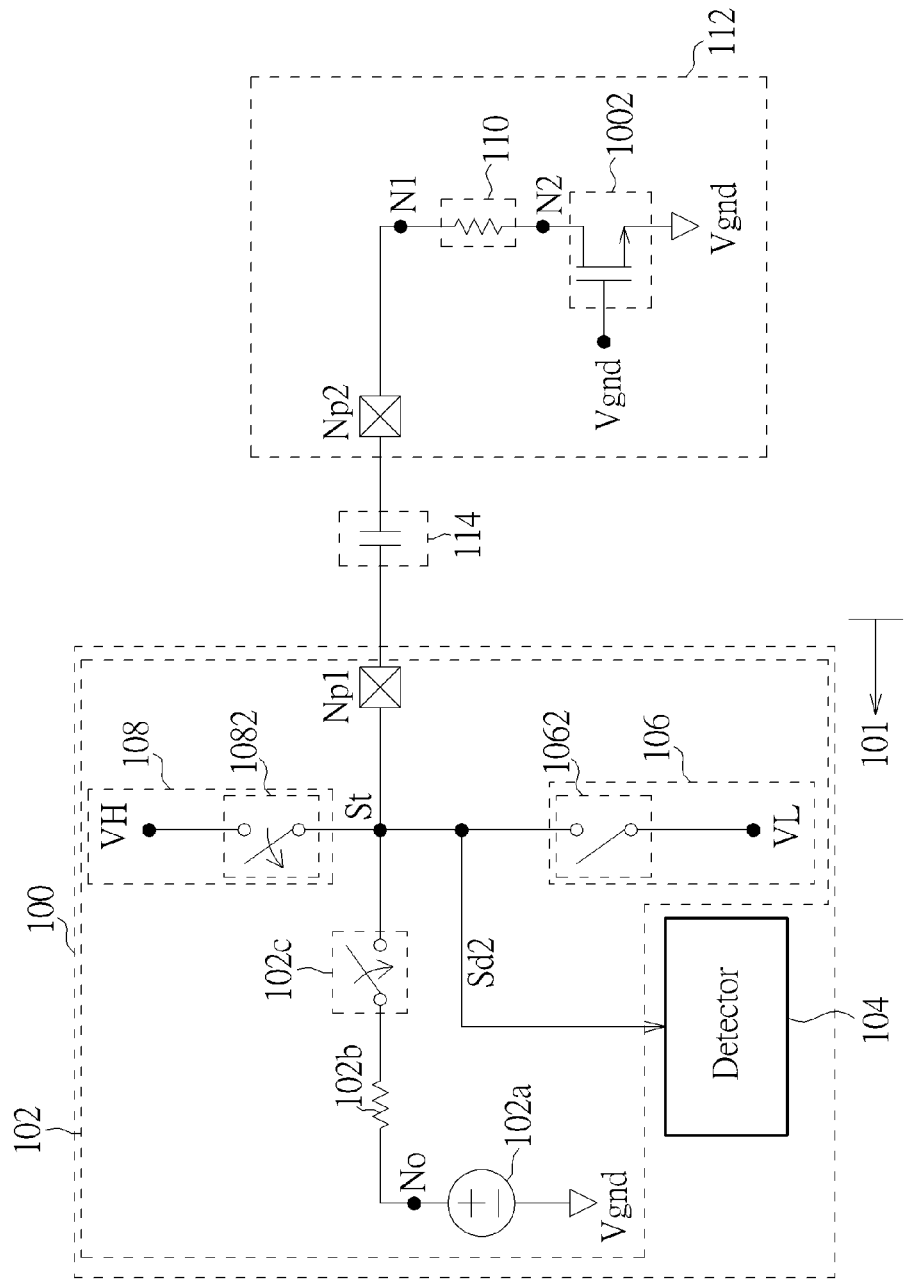
FIG. 11 is a diagram illustrating a situation of when a testing signal having a falling edge is coupled to a connecting port of a USB transmitter according to an embodiment of the present invention, in which a terminal of an external circuit element is disconnected from a ground voltage via an NMOS transistor.

Afterwards, the present detecting circuit 100 is arranged to output the testing signal St having the second signal edge (i.e. the falling edge) to the connecting port Np1, and then detect the voltage on the connecting port Np1 to determine if the falling edge occurs on the connecting port Np1. Please refer to FIG. 11, which is a diagram illustrating the situation of when the testing signal St having the falling edge is coupled to the connecting port Np1 of the USB transmitter 101 according to an embodiment of the present invention, in which the terminal N2 of the external circuit element 110 is disconnected from the ground voltage Vgnd via the NMOS transistor 1002.

Figure 12:
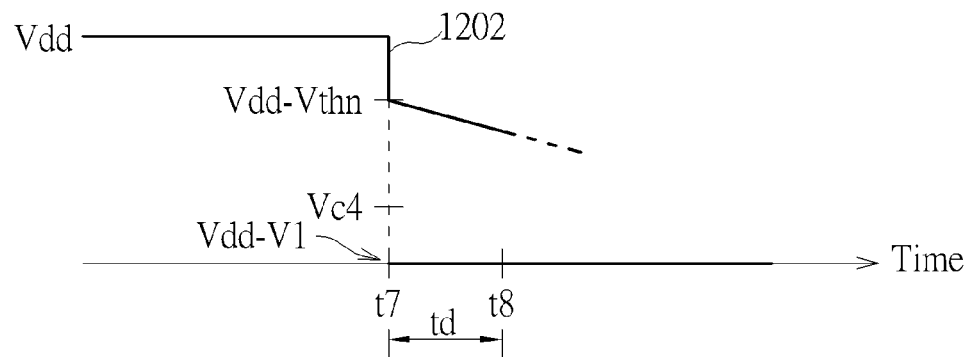
FIG. 12 is a timing diagram illustrating a voltage variation on a connecting port according to a fourth embodiment of the present invention.
Figure 13:
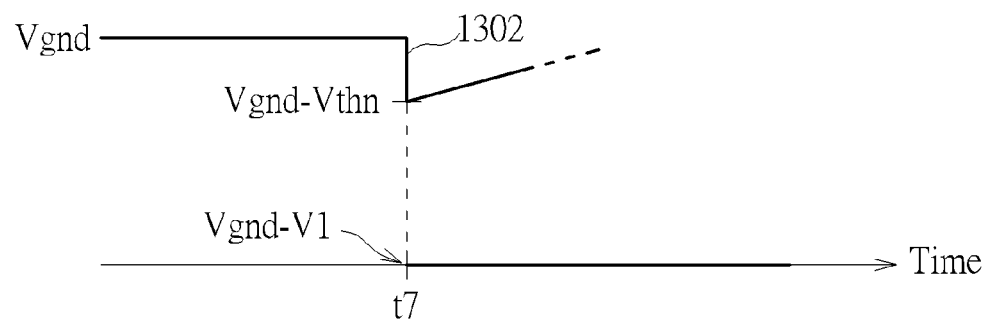
FIG. 13 is a timing diagram illustrating a voltage variation on a connecting port of a USB receiver according to a fourth embodiment of the present invention.

The switch 1082 of the second level setting circuit 108 is first arranged to couple the second signal level VH to the connecting port Np1 to charge to the voltage level on the connecting port Np1 into the second signal level VH (e.g. the supply voltage Vdd) before the time t7 as shown in FIG. 12. FIG. 12 is a timing diagram illustrating the voltage variation 1202 on the connecting port Np1 according to an embodiment of the present invention. Then, at time t7, the switch 1082 is turned off and the switch 102c is arranged to couple the predetermined signal level V1, which is lower than the second signal level VH, to the connecting port Np1. Then, the testing signal St having the second signal edge is coupled to the connecting port Np1 (as the dotted line in FIG. 12). However, the voltage on the connecting port Np1 is not changed into the voltage Vdd−V1 at time t7. Instead, the voltage on the connecting port Np1 is first changed into the voltage Vdd−Vthn at time t7, and then slowly ramp-down towards the voltage Vdd−V1 as shown in FIG. 12, wherein the voltage Vthn is substantially equal to the threshold voltage-drop to turn on the NMOS transistor 1002. Moreover, the voltage on the connecting port Np2 is not changed into the voltage Vgnd−V1 at time t7. Instead, the voltage on the connecting port Np2 is first changed into the voltage Vgnd−Vthn at time t7, and then slowly increases towards the voltage Vgnd as shown in FIG. 13. FIG. 13 is a timing diagram illustrating the voltage variation 1302 on the connecting port Np2 according to an embodiment of the present invention. It should be noted that the voltage on the connecting port Np2 before the time t7 is discharged to the ground voltage Vgnd via the NMOS transistor 1002.

According to FIGS. 12-13, it can be seen that the voltage on the connecting port Np1 and the connecting port Np2 at the time t1 do not jump by the voltage difference produced by the testing signal generator 102, i.e. the voltage V1. This is because the NMOS transistor 1002 is turned on whenever the voltage on the connecting port Np2 reaches the voltage Vgnd−Vthn. When the NMOS transistor 1002 is turned on, a current will be induced to flow through the NMOS transistor 1002 and the external circuit element 110. Accordingly, the voltage on the connecting port Np1 is hindered from falling to the voltage Vdd−V1 at time t7.

To determine the connecting condition of the external circuit element 110, the detector 104 is arranged to detect the voltage (i.e. the second detect signal Sd2) on the connecting port Np1 at the second predetermined moment td (i.e. at time t8) after the testing signal St having the second signal edge is coupled to the connecting port Np1 for determining if the falling edge occurs on the connecting port Np1. According to FIG. 12, it can be seen that the voltage on the connecting port Np1 at time t8 is higher than the comparison voltage Vc4, which means that the connecting port Np1 is still discharging at the time t8. Therefore, the detector 104 determines there is no falling edge on the connecting port Np1 when the testing signal St having the falling edge is coupled to the connecting port Np1 via the output resistor 102b.

Therefore, according to the above detecting mechanism, a rising edge occurs on the connecting port Np1 when the testing signal St having the rising edge is coupled to the connecting port Np1. However, a falling edge does not occur on the connecting port Np1 when the testing signal St having the falling edge is coupled to the connecting port Np1. Therefore, the detector 104 determines that the terminal N2 of the external circuit element 110 is not coupled to either the ground voltage Vgnd or the supply voltage Vdd because at least one signal edge occurs on the connecting port Np1. Moreover, as the rising edge occurs on the connecting port Np1 and the falling edge does not occur on the connecting port Np1, the detector 104 can also determine that the terminal N2 of the external circuit element 110 is disconnected from the ground voltage Vgnd by the turn-off NMOS transistor 1002.

It should be noted that the first predetermined moment tc and the second predetermined moment td can be respectively well-defined according to the time constant constituted by the output resistor 102b, the capacitor 114, and the external circuit element 110. The first predetermined moment tc may equal or not equal the second predetermined moment td.

Therefore, according to the detecting method performed in FIGS. 3-4, 6-7, 9-10, 12-13 for the exemplary embodiment, by detecting the connecting port Np1 twice, the connecting condition of the external circuit element 110 can be determined. More specifically, if at least one signal edge appears on the first connecting port Np1, the detector 104 determines the terminal N2 of the external circuit element 110 is not coupled to either the ground voltage Vgnd or the supply voltage Vdd; if the signal edge on the first connecting port Np1 is a falling edge, the detector 104 determines the terminal N2 of the external circuit element 110 is disconnected from the supply voltage Vdd by a turn-off PMOS transistor (e.g. 202); and if the signal edge on the first connecting port Np1 is a rising edge, the detector 104 determines the terminal N2 of the external circuit element 110 is disconnected from the ground voltage Vgnd by a turn-off NMOS transistor (e.g. 1002).

Part III

When the Termination of the Receiver 112 is Connected to the Supply Voltage Vdd or the Ground Voltage Vgnd It is noted that FIG. 2, FIG. 5, FIG. 8, and FIG. 11 merely show the different situations of when the terminal N2 of the external circuit element 110 is disconnected from the reference voltage Vref (e.g. the supply voltage Vdd or the ground voltage Vgnd). However, when the terminal N2 of the external circuit element 110 is coupled to the reference voltage Vref, the present detecting circuit 100 is also capable of identifying this situation. However, it is noted that the present detecting circuit 100 does not need to determine if the terminal N2 of the external circuit element 110 is coupled to the supply voltage Vdd or the ground voltage Vgnd or the common mode voltage Vcm in this situation. Please refer to FIG. 14, which is a diagram illustrating the situation of when the USB receiver 112 is coupled to the USB transmitter 101 and the terminal N2 of the external circuit element 110 is coupled to the reference voltage Vref (e.g. the supply voltage Vdd or the ground voltage Vgnd or the common mode voltage Vcm) according to an embodiment of the present invention. It should be noted that when the terminal N2 of the external circuit element 110 is coupled to the supply voltage Vdd, a PMOS transistor (e.g. the PMOS transistor 202 as shown in FIG. 2) is used to connect the terminal N2 of the external circuit element 110 to the supply voltage Vdd. When the terminal N2 of the external circuit element 110 is coupled to the ground voltage Vgnd, a NMOS transistor (e.g. the NMOS transistor 1002 as shown in FIG. 10) is used to connect the terminal N2 of the external circuit element 110 to the ground voltage Vgnd. It should be noted that the USB transmitter 101 does not acknowledge that the external circuit element 110 is coupled to the reference voltage Vref at this point. More specifically, the USB transmitter 101 does not acknowledge the external circuit element 110 is coupled between the connecting port Np2 and the reference voltage Vref at this point.

Figure 14:
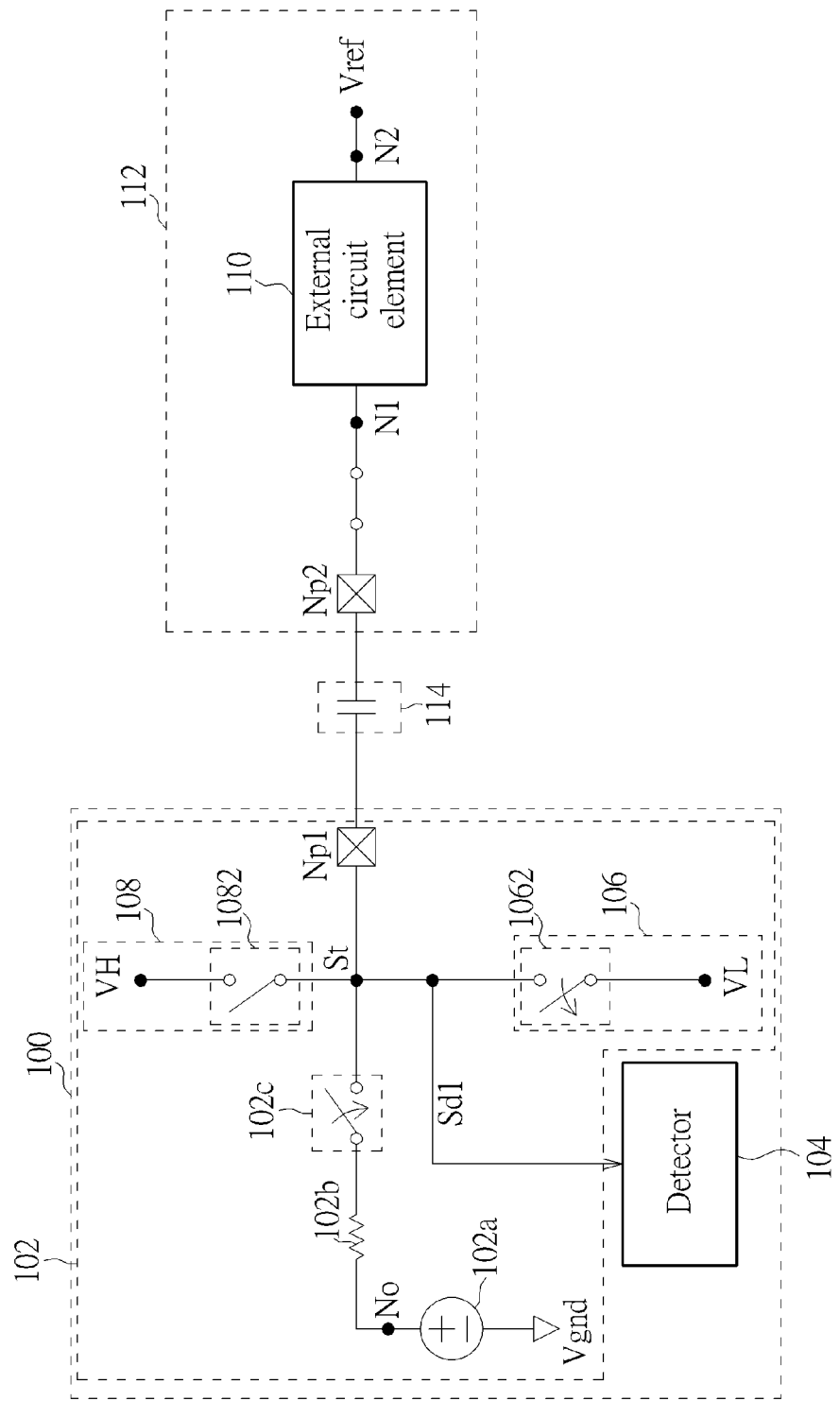
FIG. 14 is a diagram illustrating a situation where a USB receiver is coupled to a USB transmitter and a terminal of an external circuit element is coupled to a reference voltage according to an embodiment of the present invention.

Then, in FIG. 14, to determine if the terminal N2 of the external circuit element 110 is coupled to the reference voltage Vref, the present detecting circuit 100 is first arranged to output the testing signal St having the first signal edge to the connecting port Np1, then output the testing signal St having the second signal edge to the connecting port Np1, and then determine the connecting condition of the external circuit element 110 according to both the detecting results.

Figure 15:
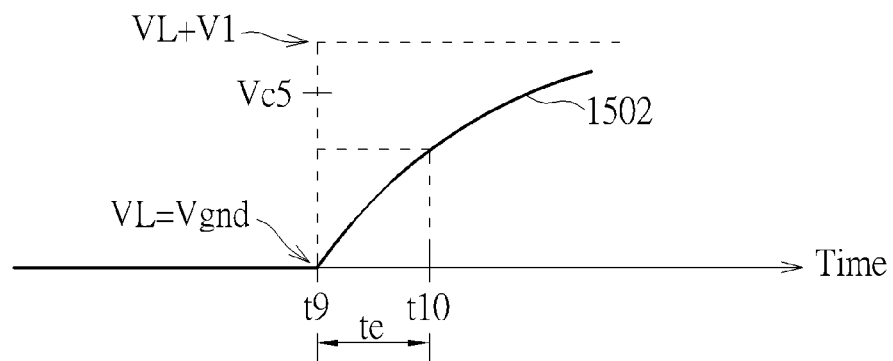
FIG. 15 is a timing diagram illustrating a voltage variation on a connecting port according to a fifth embodiment of the present invention.
Figure 16:
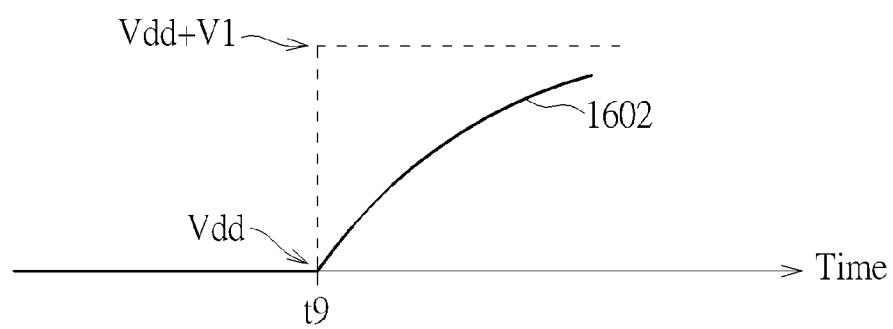
FIG. 16 is a timing diagram illustrating a voltage variation on a connecting port of a USB receiver according to a fifth embodiment of the present invention.

Similarly, the switch 1062 of the first level setting circuit 106 is first arranged to couple the first signal level VL to the connecting port Np1 to discharge to the voltage level on the connecting port Np1 into the first signal level VL (e.g. the ground voltage Vgnd) before the time t9 as shown in FIG. 15. FIG. 15 is a timing diagram illustrating the voltage variation 1502 on the connecting port Np1 according to an embodiment of the present invention. Then, at time t9, the switch 1062 is turned off and the switch 102c is arranged to couple the predetermined signal level V1, which is higher than the first signal level VL, to the connecting port Np1. Then, the testing signal St having the first signal edge is coupled to the connecting port Np1 (shown as the dotted line in FIG. 15). However, the voltage on the connecting port Np1 is not changed into the voltage VL+V1 at time t9. Instead, the voltage on the connecting port Np1 increases gradually towards the voltage VL+V1 after time t9 as shown in FIG. 15. Moreover, the voltage on the connecting port Np2 is not changed into the voltage Vdd+V1 at time t9. Instead, the voltage on the connecting port Np2 also increases gradually towards the voltage VL+V1 after time t9 as shown in FIG. 16. FIG. 16 is a timing diagram illustrating the voltage variation 1602 on the connecting port Np2 according to an embodiment of the present invention. It should be noted that the voltage on the connecting port Np2 before the time t9 is charged to the supply voltage Vdd via a PMOS transistor (e.g. the PMOS transistor 202).

According to FIGS. 15-16, it can be seen that the voltage on the connecting port Np1 and the connecting port Np2 at the time t9 do not jump by the voltage difference produced by the testing signal generator 102, i.e. the voltage V1. This is because the terminal N2 of the external circuit element 110 is coupled to the reference voltage Vref, and the testing signal St having the rising edge needs to charge the capacitor 114 according to the time constant contributed by the capacitor 114 and the output resistor 102b. Therefore, the voltage on the connecting port Np1 increases gradually towards the voltage VL+V1 after time t9, and the voltage on the connecting port Np2 also increases gradually towards the voltage Vdd+V1 after time t9.

The detector 104 is first arranged to detect the voltage (i.e. the first detect signal Sd1) on the connecting port Np1 at the first predetermined moment tc (i.e. at time t10) after the testing signal St having the first signal edge is coupled to the connecting port Np1 for determining if the rising edge occurs on the connecting port Np1. According to FIG. 15, it can be seen that the voltage on the connecting port Np1 at time t10 is smaller than the comparison voltage Vc5, which means that the connecting port Np1 is still charging at the time t10. Therefore, the detector 104 determines there is no rising edge on the connecting port Np1 when the testing signal St having the rising edge is coupled to the connecting port Np1 via the output resistor 102b.

Figure 17:
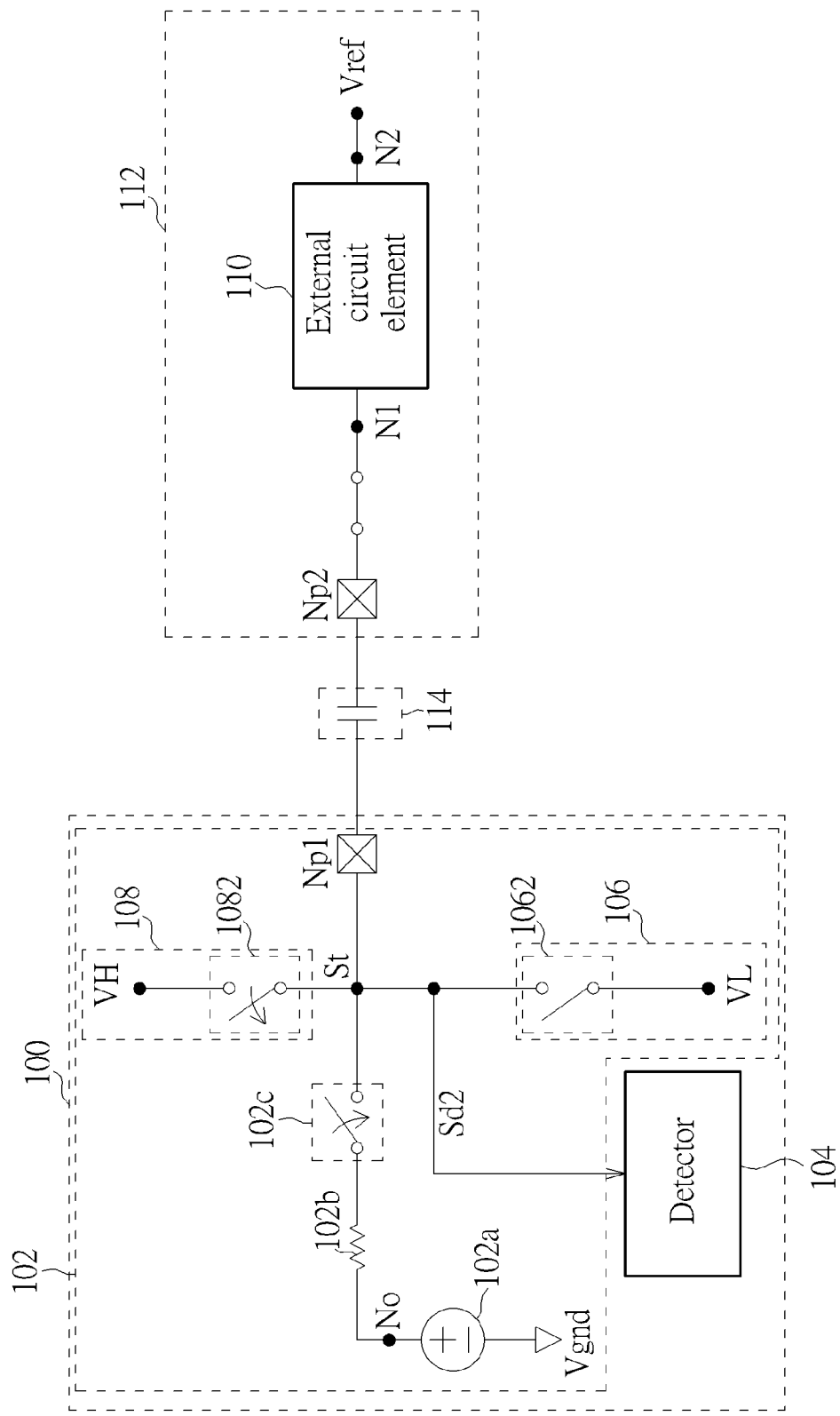
FIG. 17 is a diagram illustrating a situation where a USB receiver is coupled to a USB transmitter and a terminal of an external circuit element is coupled to a reference voltage, and a detecting circuit is arranged to output a testing signal having a second signal edge to a connecting port according to an embodiment of the present invention.

Afterwards, the present detecting circuit 100 is arranged to output the testing signal St having the second signal edge to the connecting port Np1 for determining if the falling edge occurs on the connecting port Np1 as shown in FIG. 17. FIG. 17 is a diagram illustrating the situation where the USB receiver 112 is coupled to the USB transmitter 101 and the terminal N2 of the external circuit element 110 is coupled to the reference voltage Vref (e.g. the supply voltage Vdd or the ground voltage Vgnd), and the detecting circuit 100 is arranged to output the testing signal St having the second signal edge to the connecting port Np1 according to an embodiment of the present invention.

Figure 18:
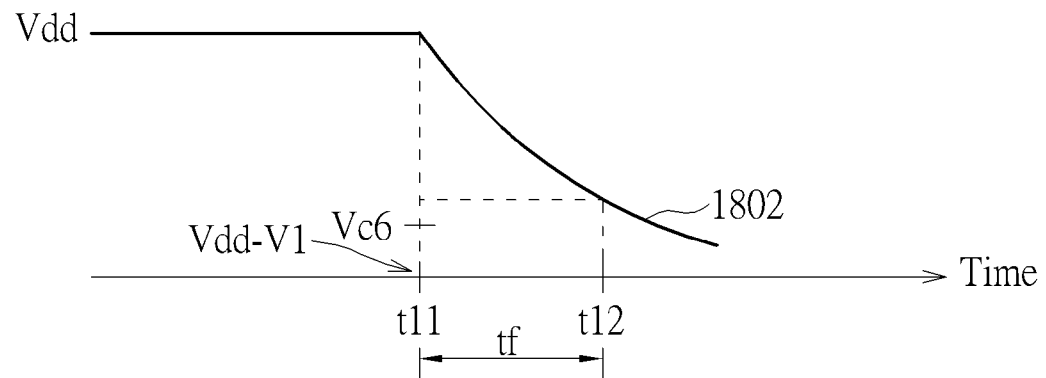
FIG. 18 is a timing diagram illustrating a voltage variation on a connecting port according to a sixth embodiment of the present invention.
Figure 19:
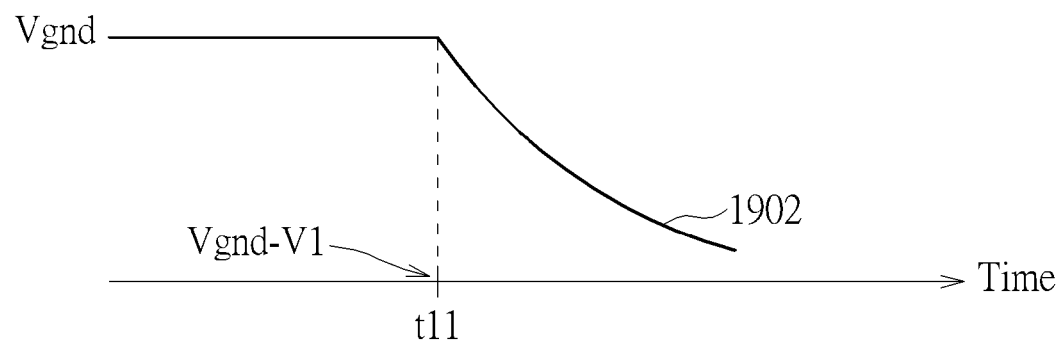
FIG. 19 is a timing diagram illustrating a voltage variation on a connecting port of a USB receiver according to a sixth embodiment of the present invention.

Similarly, the switch 1082 of the second level setting circuit 108 is first arranged to couple the second signal level VH to the connecting port Np1 to charge to the voltage level on the connecting port Np1 into the second signal level VH (e.g. the supply voltage Vdd) before the time t11 as shown in FIG. 18. FIG. 18 is a timing diagram illustrating the voltage variation 1802 on the connecting port Np1 according to an embodiment of the present invention. Then, at time t11, the switch 1082 is turned off and the switch 102c is arranged to couple the predetermined signal level V1, which is lower than the second signal level VH, to the connecting port Np1. Then, the testing signal St having the second signal edge is coupled to the connecting port Np1 (shown as the dotted line in FIG. 18). However, the voltage on the connecting port Np1 is not changed into the voltage Vdd-V1 at time t11. Instead, the voltage on the connecting port Np1 decreases gradually towards the voltage Vdd-V1 after time t11 as shown in FIG. 18. Moreover, the voltage on the connecting port Np2 is not changed into the voltage Vgnd-V1 at time t11. Instead, the voltage on the connecting port Np2 also decreases gradually towards the voltage Vgnd-V1 after time t11 as shown in FIG. 19. FIG. 19 is a timing diagram illustrating the voltage variation 1902 on the connecting port Np2 according to an embodiment of the present invention. It should be noted that the voltage on the connecting port Np2 before the time t11 is discharged to the ground voltage Vgnd via a NMOS transistor (e.g. the NMOS transistor 1002).

According to FIGS. 18-19, it can be seen that the voltage on the connecting port Np1 and the connecting port Np2 at the time t11 does not jump by the voltage difference produced by the testing signal generator 102, i.e. the voltage V1. This is because the terminal N2 of the external circuit element 110 is coupled to the reference voltage Vref, and the testing signal St having the falling edge generated by the testing signal generator 102 needs to discharge the capacitor 114 according to the time constant contributed by the capacitor 114 and the output resistor 102b. Therefore, the voltage on the connecting port Np1 decreases gradually towards the voltage Vdd-V1 after time t11, and the voltage on the connecting port Np2 also decreases gradually towards the voltage Vgnd-V1 after time t11.

The detector 104 detects the voltage (i.e. the second detect signal Sd2) on the connecting port Np1 at the second predetermined moment tf (i.e. at time t12) after the testing signal St having the second signal edge is coupled to the connecting port Np1 for determining if the falling edge occurs on the connecting port Np1. According to FIG. 18, it can be seen that the voltage on the connecting port Np1 at time t12 is higher than the comparison voltage Vc6, which means that the connecting port Np1 is still discharging at the time t12. Therefore, the detector 104 determines there is no falling edge on the connecting port Np1 when the testing signal St having the falling edge is coupled to the connecting port Np1 via the output resistor 102b.

Therefore, according to the above detecting mechanism, neither a rising edge nor a falling occurs on the connecting port Np1 when the testing signal St having the rising edge and the falling edge is coupled to the connecting port Np1. Therefore, the detector 104 determines that the terminal N2 of the external circuit element 110 is coupled to the reference voltage Vref, which may be the ground voltage Vgnd or the supply voltage Vdd or the common mode voltage Vcm because there is no signal edge on the connecting port Np1. More specifically, the detector 104 determines that the external circuit element 110 is coupled between the connecting port Np1 and the reference voltage Vref.

It should be noted that the first predetermined moment te and the second predetermined moment tf can be respectively well-defined according to the time constant constituted by the output resistor 102b, the capacitor 114, and the external circuit element 110. The first predetermined moment te may equal or not equal the second predetermined moment tf.

In conclusion, according to the detecting method performed in FIGS. 3-4, 6-7, 9-10, 12-13, 15-16, 18-19 for the exemplary embodiment, by detecting the connecting port Np1 twice, the connecting condition of the external circuit element 110 can be determined. More specifically, if at least one signal edge appears on the first connecting port Np1, the detector 104 determines the terminal N2 of the external circuit element 110 is not coupled to either the ground voltage Vgnd or the supply voltage Vdd; if the signal edge on the first connecting port Np1 is a falling edge, the detector 104 determines the terminal N2 of the external circuit element 110 is disconnected from the supply voltage Vdd by a turn-off PMOS transistor (e.g. 202); if the signal edge on the first connecting port Np1 is a rising edge, the detector 104 determines the terminal N2 of the external circuit element 110 is disconnected from the ground voltage Vgnd by a turn-off NMOS transistor (e.g. 1002); and if no signal edge appears on the first connecting port Np1, the detector 104 determines the terminal N2 of the external circuit element 110 is coupled to the reference voltage Vref, which may be the supply voltage Vdd or the ground voltage Vgnd or the common mode voltage Vcm.

Part IV

Other embodiments

Figure 20:
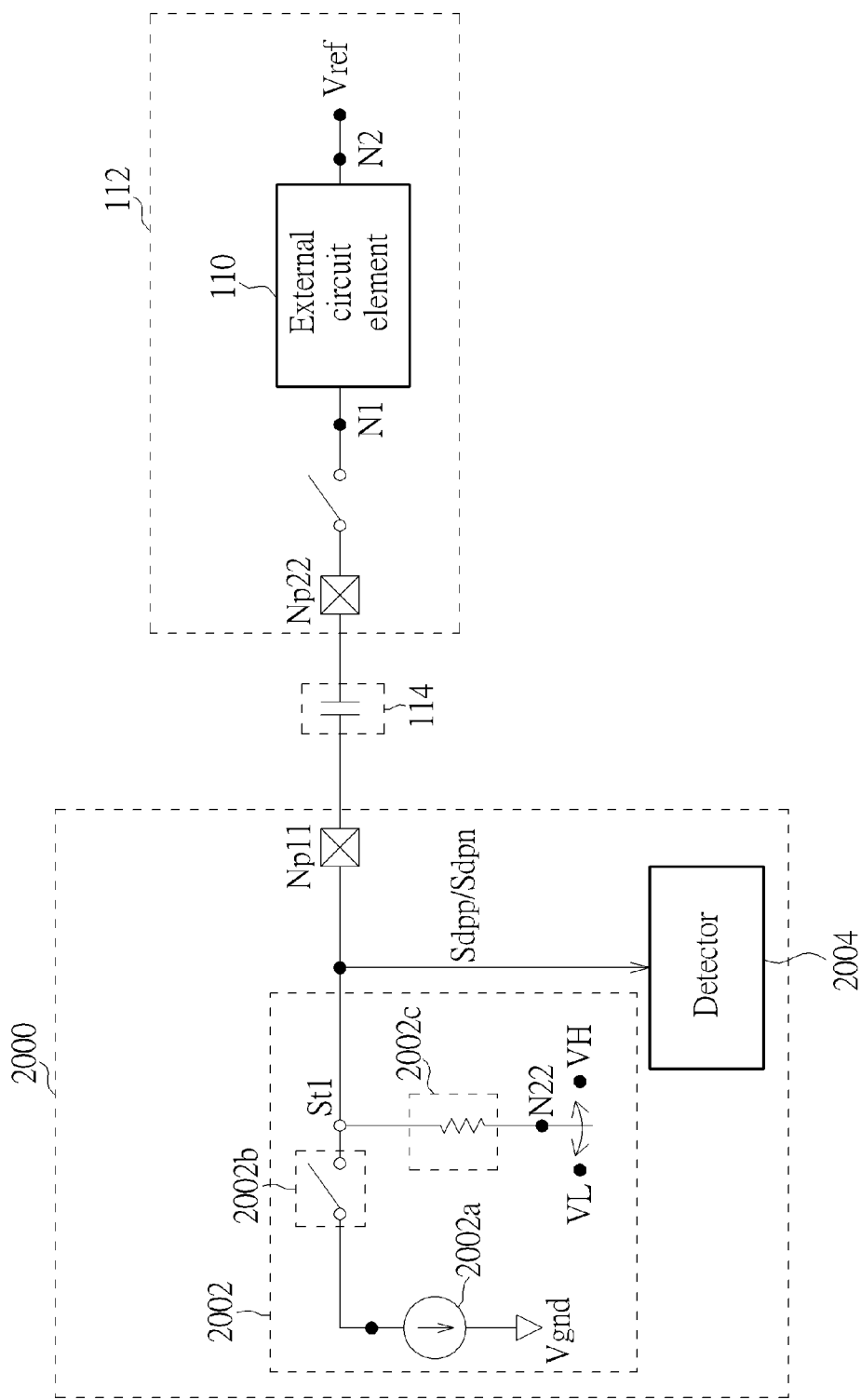
FIG. 20 is a diagram illustrating a detecting circuit according to a second exemplary embodiment of the present invention.

In addition, even though the detecting circuit 100 in the embodiments of FIG. 1, FIG. 2, FIG. 5, FIG. 8, FIG. 11, FIG. 14, and FIG. 17 are voltage-based circuit, this is not a limitation of the present invention. The detecting circuit 100 may also be a current-based circuit. FIG. 20 is a diagram illustrating a detecting circuit 2000 according to an exemplary embodiment of the present invention. The detecting circuit 2000 is used to generate a testing signal St1 having a first signal edge (e.g. the rising edge) and a second signal edge (e.g. the falling edge) for the connecting port Np11, and to detect if a rising edge and/or a falling edge occurs on the connecting port Np11. The detecting circuit 2000 comprises a testing signal generator 2002 and a detector 2004. The testing signal generator 2002 is arranged to selectively generate a testing signal St1 having a rising edge and/or a falling edge, and to couple the testing signal St1 to the connecting port Np11 of the USB transmitter. The detector 2004 is similar to the above-mentioned detector 104, thus the detailed operation of the detector 2004 is omitted here for brevity. The testing signal generator 2002 comprises a waveform generator 2002a such as a current source, a switch 2002b, and an output resistor 2002c. The output resistor 2002c has a first terminal coupled to the connecting port Np11, and a second terminal N22 is arranged to selectively couple to a first signal level (e.g. the low voltage level VL) or a second signal level (e.g. the high voltage level VH).

If the testing signal generator 2002 needs to couple the testing signal St1 having the rising edge to the connecting port Np11, the switch 2002b first disconnects the waveform generator 2002a from the connecting port Np11, and the second terminal N22 of the output resistor 2002c is arranged to couple to the low voltage level VL. Then, the switch 2002b is arranged to couple the waveform generator 2002a to the connecting port Np11, in which the waveform generator 2002a outputs a positive current level. Accordingly, the testing signal St1 having the rising edge can be coupled to the connecting port Np11 via the output resistor 2002c.

If the testing signal generator 2002 needs to couple the testing signal St1 having the falling edge to the connecting port Np11, the switch 2002b first disconnects the waveform generator 2002a from the connecting port Np11, and the second terminal N22 of the output resistor 2002c is arranged to couple to the high voltage level VH. Then, the switch 2002b is arranged to couple the waveform generator 2002a to the connecting port Np11, in which the waveform generator 2002a outputs a negative current level. Accordingly, the testing signal St1 having the falling edge can be coupled to the connecting port Np11 via the output resistor 2002c.

It should be noted that FIG. 20 merely provides an embodiment capable of providing the testing signal St1 having the rising edge and the falling edge; the detailed detecting mechanism is similar to the operation of detecting circuit as shown in FIGS. 1-19. Those skilled in the art should understand the operation of the detecting circuit 2000 after reading the above-mentioned disclosure, thus the detailed description is omitted here for brevity.

Figure 21:
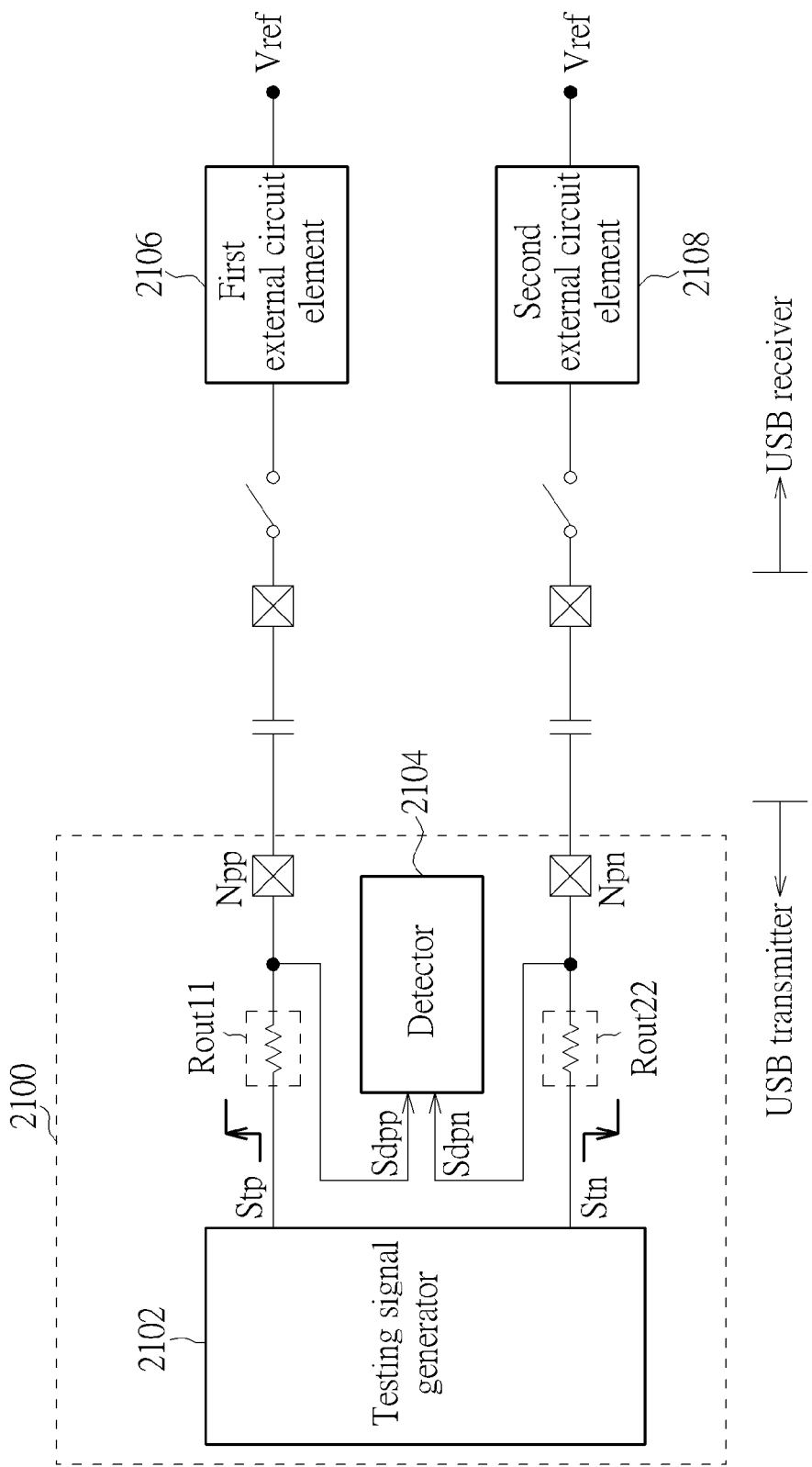
FIG. 21 is a diagram illustrating a detecting circuit according to a third exemplary embodiment of the present invention.

Moreover, even though the above-mentioned detecting circuits are used in a single-ended circuit, this is not a limitation of the present invention. The detecting circuit may also be used in a differential circuit. FIG. 21 is a diagram illustrating a detecting circuit 2100 according to an exemplary embodiment of the present invention. The detecting circuit 2100 comprises a testing signal generator 2102 and a detector 2104. The testing signal generator 2102 is arranged to generate a first testing signal Stp having a first signal edge and a second testing signal Stn having a second signal edge, and to couple the first testing signal Stp and the second testing signal Stn to a first connecting port Npp and a second connecting port Npn respectively, wherein the first connecting port Npp and the second connecting port Npn are differential terminals of a USB transmitter. The detector 2104 is arranged to detect a first detect signal Sdpp on the first connecting port Npp at a first predetermined tpp moment after the first testing signal Stp is coupled to the first connecting port Npp, and to detect a second detect signal Sdpn on the second connecting port Npn at a second predetermined moment tpn after the second testing signal Stn is coupled to the second connecting port Npn. The detector 2104 is further arranged to determine if a first external circuit element 2106 is coupled between the first connecting port Npp and the reference voltage Vref and if a second external circuit element 2108 is coupled between the second connecting port Npn and the reference voltage Vref according to the first detect signal Sdpp and the second detect signal Sdpn. Moreover, for brevity, the first signal edge is the rising edge, and the second signal edge is the falling edge in the following description for this exemplary embodiment. This is not a limitation of the exemplary embodiment, however.

Figure 22A:
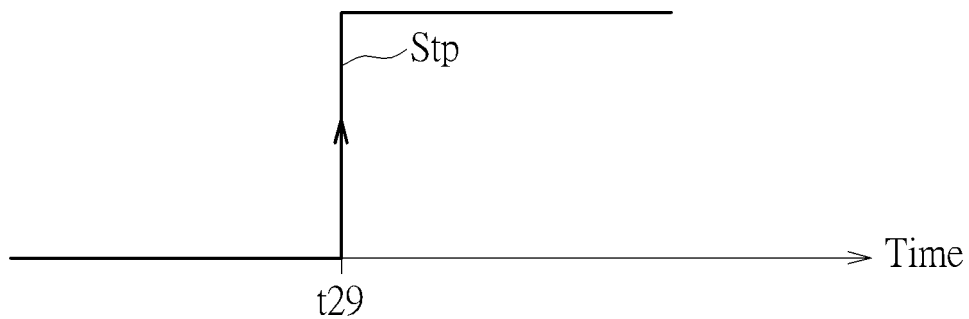
FIG. 22A is a timing diagram illustrating a first testing signal according to an embodiment of the present invention.
Figure 22B:
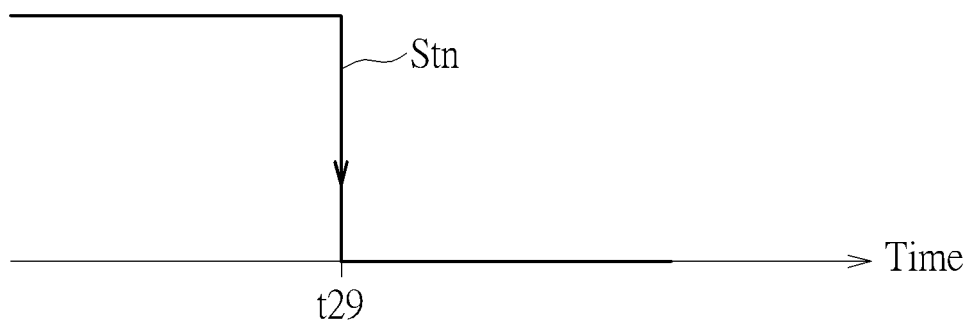
FIG. 22B is a timing diagram illustrating a second testing signal according to an embodiment of the present invention.

In this embodiment, to detect the connecting conditions of the first external circuit element 2106 and the second external circuit element 2108, the testing signal generator 2102 generates two testing signals, i.e. the first testing signal Stp having the rising edge and the second testing signal Stn having the falling edge, and couples the first testing signal Stp and the second testing signal Stn to the first connecting port Npp and the second connecting port Npn via the output resistor Rout11 and Rout22 respectively as shown in FIG. 22A and FIG. 22B. FIG. 22A is a timing diagram illustrating the first testing signal Stp according to an embodiment of the present invention. FIG. 22B is a timing diagram illustrating the second testing signal Stn according to an embodiment of the present invention. It is noted that, in this embodiment, the rising edge and the falling edge of the first testing signal Stp and the second testing signal Stn respectively generated by the testing signal generator 2102 occur at the same time, i.e. time t29. Therefore, the detector 2104 detects the voltage (i.e. the first detect signal Sdpp) on the first connecting port Npp and the voltage (i.e. the second detect signal Sdpn) on the second connecting port Npn at the same time. This is not a limitation of the present invention, however. The occurring times of the signal edges and the detecting times of the voltages on the connecting ports (i.e. Npn, Npp) can be different.

Afterwards, similar to the above mentioned embodiments, the detector 2104 detects the voltage (i.e. the first detect signal Sdpp) on the first connecting port Npp and the voltage (i.e. the second detect signal Sdpn) on the second connecting port Npn to determine if any signal edge (rising edge or falling edge) occurs on the first connecting port Npp or the second connecting port Npn.

More specifically, the detector 2104 compares the voltage on the first connecting port Npp with a first predetermined signal level to determine if the rising edge appears on the first connecting port Npp. The detector 2104 also compares the voltage on the second connecting port Npn with a second predetermined signal level to determine if the falling edge appears on the second connecting port Npn. If the rising edge appears on the first connecting port Npp or if the falling edge appears on the second connecting port Npn, the detector 2104 determines the first external circuit element 2106 is not coupled between the first connecting port Npp and the reference voltage Vref, and determines the second external circuit element 2108 is also not coupled between the second connecting port Npn and the reference voltage Vref.

Otherwise, if the rising edge does not appear on the first connecting port Npp and if the falling edge does not appear on the second connecting port Npn, the detector 2104 determines the first external circuit element 2106 is coupled between the first connecting port Npp and the reference voltage Vref, and determines the second external circuit element 2108 is also coupled between the second connecting port Npn and the reference voltage Vref.

Accordingly, when the circuit system is a differential circuit, if at least one signal edge appears on one of the first connecting port Npp and the second connecting port Npn, the detector 2104 determines both the first external circuit element 2106 and the second external circuit element 2108 are not coupled between the first connecting port Npp and the second connecting port Npn and the reference voltage Vref respectively. If the signal edges appear on both the first connecting port Npp and the second connecting port Npn, the detector 2104 determines both the first external circuit element 2106 and the second external circuit element 2108 are coupled between the first connecting port Npp and the second connecting port Npn and the reference voltage Vref respectively.

It should be noted that the detailed detecting mechanism in FIG. 21 is similar to the operation of the detecting circuit as shown in FIGS. 1-19 except that the circuit system in FIG. 21 is a differential circuit. Those skilled in the art should understand the operation of the detecting circuit 2100 after reading the above-mentioned disclosure, thus the detailed description is omitted here for brevity.

Figure 23:
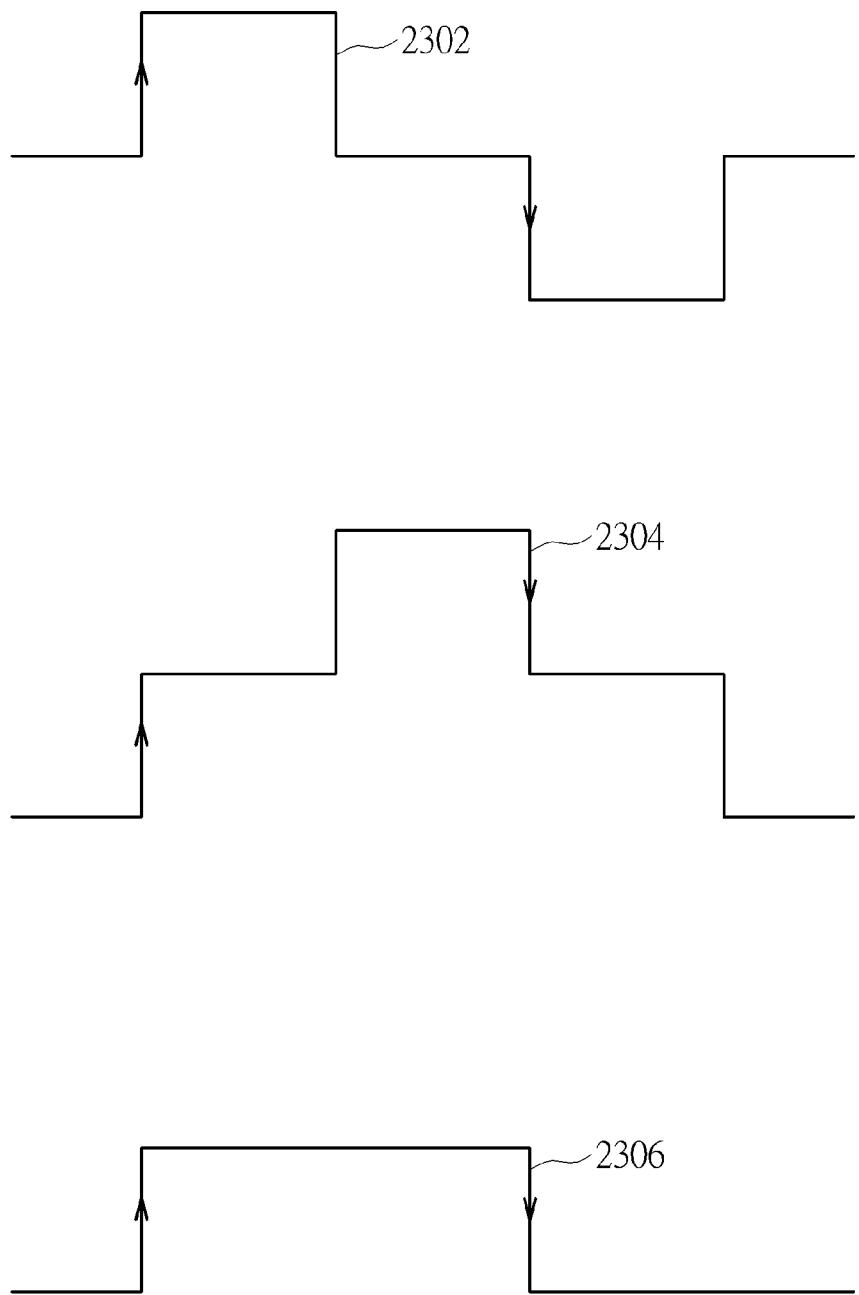
FIG. 23 is a timing diagram illustrating three different waveforms each having a rising edge and a falling edge according to an embodiment of the present invention.

Moreover, the present invention is not limited to the waveforms generated by the above mentioned testing signal generators; any kind of waveforms having two different signal edges can be applied to test the connecting condition of an external circuit element. Please refer to FIG. 23, which is a timing diagram illustrating three different waveforms (i.e. 2302, 2304, and 2306) each having at least a rising edge and at least a falling edge according to an embodiment of the present invention. According to the above mentioned detecting mechanism, any one of the waveforms 2302, 2304, 2306 can be used to detect the connecting condition of an external circuit element no matter the circuit system is single-ended or differential. Those skilled in the art should understand the operation of using any of the waveforms 2302, 2304, 2306 to detect the connecting condition of an external circuit element after reading the above-mentioned disclosure, thus the detailed description is omitted here for brevity.

Figure 24:
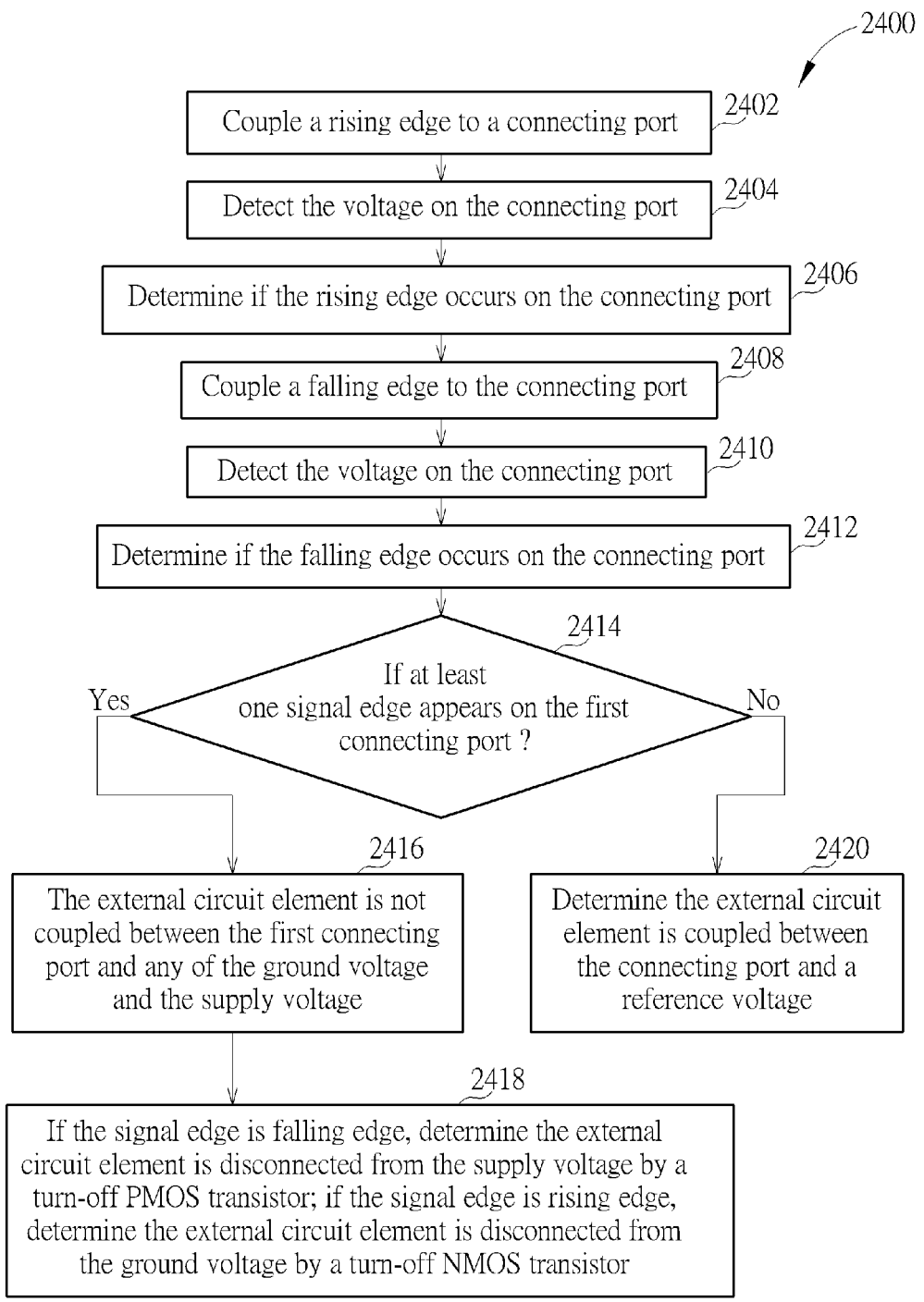
FIG. 24 is a flowchart illustrating a circuit detecting method according to a first embodiment of the present invention.

Accordingly, the detecting mechanism performed by the detecting circuit 100 can be summarized into the steps as shown in FIG. 24. FIG. 24 is a flowchart illustrating a circuit detecting method 2400 according to an embodiment of the present invention. Provided that substantially the same result is achieved, the steps of the flowchart shown in FIG. 24 need not be in the exact order shown and need not be contiguous; that is, other steps can be intermediate. The circuit detecting method 2400 comprises:

Step 2402: Couple the testing signal St having the rising edge to the connecting port Np1;

Step 2404: Detect the voltage on the connecting port Np1 after the first predetermined moment;

Step 2406: Determine if the rising edge occurs on the connecting port Np1;

Step 2408: Couple the testing signal St having the falling edge to the connecting port Np1;

Step 2410: Detect the voltage on the connecting port Np1 after the second predetermined moment;

Step 2412: Determine if the falling edge occurs on the connecting port Np1;

Step 2414: If at least one signal edge appears on the first connecting port Np1, go to step 2416; if no signal edge appears on the first connecting port Np1, go to step 2420;

Step 2416: Determine the external circuit element 110 is not coupled between the first connecting port Np1 and either the ground voltage Vgnd or the supply voltage Vdd, go to step 2418;

Step 2418: If the signal edge on the first connecting port Np1 is a falling edge, determine the terminal N2 of the external circuit element 110 is disconnected from the supply voltage Vdd by a turn-off PMOS transistor (e.g. 202); if the signal edge on the first connecting port Np1 is a rising edge, determine the terminal N2 of the external circuit element 110 is disconnected from the ground voltage Vgnd by a turn-off NMOS transistor (e.g. 1002);

Step 2420: Determine the external circuit element 110 is coupled between the connecting port Np1 and the reference voltage Vref.

Figure 25:
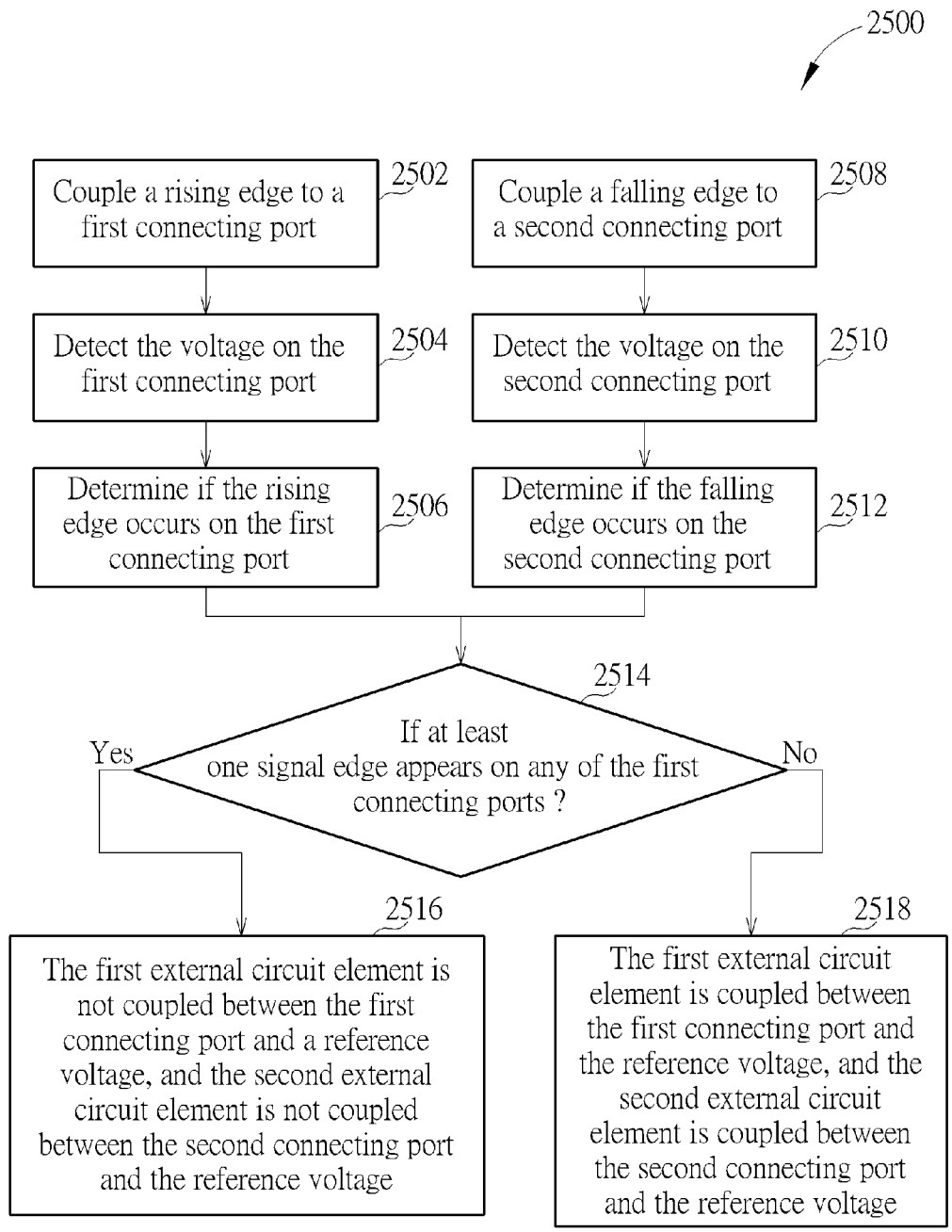
FIG. 25 is a flowchart illustrating a circuit detecting method according to a second embodiment of the present invention.

In addition, the detecting mechanism performed by the detecting circuit 2100 can be summarized into the steps as shown in FIG. 25. FIG. 25 is a flowchart illustrating a circuit detecting method 2500 according to an embodiment of the present invention. Provided that substantially the same result is achieved, the steps of the flowchart shown in FIG. 25 need not be in the exact order shown and need not be contiguous; that is, other steps can be intermediate. The circuit detecting method 2500 comprises:

Step 2502: Couple the first testing signal Stp having the rising edge to the first connecting port Npp;

Step 2504: Detect the voltage on the first connecting port Npp after the first predetermined moment;

Step 2506: Determine if the rising edge occurs on the first connecting port Npp, go to step 2514;

Step 2508: Couple the second testing signal Stn having the falling edge to the second connecting port Npn;

Step 2510: Detect the voltage on the second connecting port Npn after the second predetermined moment;

Step 2512: Determine if the falling edge occurs on the second connecting port Npn, go to step 2514;

Step 2514: If at least one signal edge appears on either the first connecting port Npp or the second connecting port Npn, go to step 2516; if no signal edge appears on either the first connecting port Npp or the second connecting port Npn, go to step 2518;

Step 2516: Determine the first external circuit element 2106 is not coupled between the first connecting port Npp and the reference voltage Vref, and the second external circuit element 2108 is also not coupled between the second connecting port Npn and the reference voltage Vref;

Step 2518: Determine the first external circuit element 2106 is coupled between the first connecting port Npp and the reference voltage Vref, and the second external circuit element 2108 is also coupled between the second connecting port Npn and the reference voltage Vref.

According to the above embodiments for the single-ended system, by detecting the voltages on a connecting port in response to a testing signal having a rising edge and a falling edge, the connecting condition of an external circuit element can be determined. For the differential system, by detecting the voltages on a first connecting port and a second connecting port in response to a first testing signal having a rising edge and a second testing signal having a falling edge respectively, the connecting conditions of a first external circuit element and a second external circuit element can be determined. Accordingly, the connecting condition of a terminal circuit can be precisely determined no matter whether the terminal circuit is terminated to or disconnected from a ground voltage Vgnd or a supply voltage Vdd.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detecting circuit, comprising:
   a testing signal generator, arranged to selectively generate a testing signal having a first signal edge or a second signal edge to a connecting port; and
   a detector, arranged to detect a first detect signal on the connecting port after the testing signal having the first signal edge is coupled to the connecting port, and to detect a second detect signal on the connecting port after the testing signal having the second signal edge is coupled to the connecting port;

wherein the detector is further arranged to determine if an external circuit element is coupled between the connecting port and a reference voltage according to the first detect signal and the second detect signal.

2. The detecting circuit of claim 1, wherein one of the first signal edge and the second signal edge is a rising edge and the other of the first signal edge and the second signal edge is a falling edge.

3. The detecting circuit of claim 1, wherein the testing signal generator comprises:
   a waveform generator, arranged to generate a predetermined signal level;
   an output resistor, coupled to the waveform generator, for receiving the predetermined signal level; and
   a switch, coupled to the output resistor, for selectively coupling the predetermined signal level to the connecting port.

4. The detecting circuit of claim 3, wherein the testing signal generator further comprises:
   a first level setting circuit, coupled to the connecting port, for selectively setting a signal level on the connecting port into a first signal level; and
   a second level setting circuit, coupled to the connecting port, for selectively setting the signal level on the connecting port into a second signal level;
   wherein the first signal level is different from the second signal level; after the first level setting circuit sets the first signal level on the connecting port, the switch is arranged to couple the predetermined signal level to the connecting port for coupling the testing signal having the first signal edge to the connecting port; and after the second level setting circuit sets the second signal level on the connecting port, the switch is arranged to couple the predetermined signal level to the connecting port for coupling the testing signal having the second signal edge to the connecting port.

5. The detecting circuit of claim 1, wherein the testing signal generator comprises:
   a waveform generator, arranged to selectively generate a predetermined signal level;
   a switch, for selectively coupling the predetermined signal level to the connecting port; and
   an output resistor, having a first terminal coupled to the connecting port, and a second terminal arranged to selectively couple to a first signal level or a second signal level.

6. The detecting circuit of claim 5, wherein the first signal level is different from the second signal level; when the second terminal is coupled to the first signal level, the switch is arranged to couple the predetermined signal level to the connecting port for coupling testing signal having the first signal edge to the connecting port; and when the second terminal is coupled to the second signal level, the switch is arranged to couple the predetermined signal level to the connecting port for coupling testing signal having the second signal edge to the connecting port.

7. The detecting circuit of claim 1, wherein the detector compares the first detect signal with a first comparison level to determine if the first signal edge appears on the connecting port, the detector also compares the second detect signal with a second comparison level to determine if the second signal edge appears on the connecting port, and if at least one of the first signal edge and the second signal edge appears on the connecting port, the detector determines the external circuit element is not coupled between the connecting port and the reference voltage.

8. The detecting circuit of claim 1, wherein the detector compares the first detect signal with a first comparison level to determine if the first signal edge appears on the connecting port, the detector also compares the second detect signal with a second comparison level to determine if the second signal edge appears on the connecting port, and if neither the first signal edge nor the second signal edge appears on the connecting port, the detector determines the external circuit element is coupled between the connecting port and the reference voltage.

9. The detecting circuit of claim 1, wherein the detector detects the first detect signal on the connecting port and detects the second detect signal on the connecting port at different moment.

10. A detecting circuit, comprising:
    a testing signal generator, arranged to generate a first testing signal having a first signal edge and a second testing signal having a second signal edge, and to couple the first testing signal and the second testing signal to a first connecting port and a second connecting port respectively; and
    a detector, arranged to detect a first detect signal on the first connecting port after the first testing signal is coupled to the first connecting port, and to detect a second detect signal on the second connecting port after the second testing signal is coupled to the second connecting port;
    wherein the detector is further arranged to determine if a first external circuit element is coupled between the first connecting port and a reference voltage and if a second external circuit element is coupled between the second connecting port and the reference voltage according to the first detect signal and the second detect signal.

11. The detecting circuit of claim 10, wherein one of the first signal edge and the second signal edge is a rising edge and the other of the first signal edge and the second signal edge is a falling edge.

12. The detecting circuit of claim 10, wherein the detector compares the first detect signal with a first comparison level to determine if the first signal edge appears on the first connecting port, the detector also compares the second detect signal with a second comparison level to determine if the second signal edge appears on the second connecting port, and if the first signal edge appears on the first connecting port or if the second signal edge appears on the second connecting port, the detector determines the first external circuit element is not coupled between the first connecting port and the reference voltage, and determines the second external circuit element is not coupled between the second connecting port and the reference voltage.

13. The detecting circuit of claim 10, wherein the detector compares the first detect signal with a first comparison level to determine if the first signal edge appears on the first connecting port, the detector also compares the second detect signal with a second comparison level to determine if the second signal edge appears on the second connecting port, and if the first signal edge does not appear on the first connecting port and if the second signal edge does not appear on the second connecting port, the detector determines the first external circuit element is coupled between the first connecting port and the reference voltage, and determines the second external circuit element is coupled between the second connecting port and the reference voltage.

14. The detecting circuit of claim 10, wherein the detector detects the first detect signal on the first connecting port and detects the second detect signal on the second connecting port at substantially the same moment.

15. A circuit detecting method, comprising:
- selectively generating a testing signal having a first signal edge or a second signal edge;
- coupling the testing signal to a connecting port;
- detecting a first detect signal on the connecting port after the testing signal having the first signal edge is coupled to the connecting port;
- detecting a second detect signal on the connecting port after the testing signal having the second signal edge is coupled to the connecting port; and
- determining if an external circuit element is coupled between the connecting port and a reference voltage according to the first detect signal and the second detect signal.

16. The circuit detecting method of claim 15, wherein one of the first signal edge and the second signal edge is a rising edge and the other of the first signal edge and the second signal edge is a falling edge.

17. The circuit detecting method of claim 15, wherein the step of determining if the external circuit element is coupled between the connecting port and the reference voltage according to the first detect signal and the second detect signal comprises:
- comparing the first detect signal with a first comparison level to determine if the first signal edge appears on the connecting port;
- comparing the second detect signal with a second comparison level to determine if the second signal edge appears on the connecting port; and
- if at least one of the first signal edge and the second signal edge appears on the connecting port, determining the external circuit element is not coupled between the connecting port and the reference voltage.

18. The circuit detecting method of claim 15, wherein the step of determining if the external circuit element is coupled between the connecting port and the reference voltage according to the first detect signal and the second detect signal comprises:
- comparing the first detect signal with a first comparison level to determine if the first signal edge appears on the connecting port;
- comparing the second detect signal with a second comparison level to determine if the second signal edge appears on the connecting port; and
- if neither the first signal edge nor the second signal edge appears on the connecting port, determining the external circuit element is coupled between the connecting port and the reference voltage.

19. A circuit detecting method, comprising:
- generating a first testing signal having a first signal edge and a second testing signal having a second signal edge;
- coupling the first testing signal and the second testing signal to a first connecting port and a second connecting port respectively;
- detecting a first detect signal on the first connecting port after the first testing signal is coupled to the first connecting port;
- detecting a second detect signal on the second connecting port after the second testing signal is coupled to the connecting port; and
- determining if a first external circuit element is coupled between the first connecting port and a reference voltage and if a second external circuit element is coupled between the second connecting port and the reference voltage according to the first detect signal and the second detect signal.

20. The circuit detecting method of claim 19, wherein one of the first signal edge and the second signal edge is a rising edge and the other of the first signal edge and the second signal edge is a falling edge.

21. The circuit detecting method of claim 19, wherein the step of determining if the first external circuit element is coupled between the first connecting port and the reference voltage and if the second external circuit element is coupled between the second connecting port and the reference voltage according to the first detect signal and the second detect signal comprises:
- comparing the first detect signal with a first comparison level to determine if the first signal edge appears on the first connecting port;
- comparing the second detect signal with a second comparison level to determine if the second signal edge appears on the second connecting port; and
- if the first signal edge appears on the first connecting port or if the second signal edge appears on the second connecting port, determining the first external circuit element is not coupled between the first connecting port and the reference voltage, and determining the second external circuit element is not coupled between the second connecting port and the reference voltage.

22. The circuit detecting method of claim 19, wherein the step of determining if the first external circuit element is coupled between the first connecting port and the reference voltage and if the second external circuit element is coupled between the second connecting port and the reference voltage according to the first detect signal and the second detect signal comprises:
- comparing the first detect signal with a first comparison level to determine if the first signal edge appears on the first connecting port;
- comparing the second detect signal with a second comparison level to determine if the second signal edge appears on the second connecting port; and
- if the first signal edge does not appear on the first connecting port and if the second signal edge does not appear on the second connecting port, determining the first external circuit element is coupled between the first connecting port and the reference voltage, and determining the second external circuit element is coupled between the second connecting port and the reference voltage.

* * * * *